US012214595B2

(12) United States Patent
Shimazaki et al.

(10) Patent No.: US 12,214,595 B2
(45) Date of Patent: Feb. 4, 2025

(54) LIQUID CONTAINER

(71) Applicant: SEIKO EPSON CORPORATION, Tokyo (JP)

(72) Inventors: Jun Shimazaki, Shiojiri (JP); Azusa Takagi, Shiojiri (JP); Kazuyoshi Mizuno, Chino (JP); Shigenori Nakagawa, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 142 days.

(21) Appl. No.: 17/936,174

(22) Filed: Sep. 28, 2022

(65) Prior Publication Data

US 2023/0100918 A1 Mar. 30, 2023

(51) Int. Cl.
*B41J 2/175* (2006.01)

(52) U.S. Cl.
CPC ....... *B41J 2/17513* (2013.01); *B41J 2/17523* (2013.01); *B41J 2/17546* (2013.01); *B41J 2/17553* (2013.01); *B41J 2/17596* (2013.01)

(58) Field of Classification Search
CPC ................ B41J 2/17513; B41J 2/17523; B41J 2/17546; B41J 2/17553; B41J 2/17596; B41J 2/17563; B41J 2/175; B41J 2/17503
See application file for complete search history.

(56) References Cited

U.S. PATENT DOCUMENTS

2002/0112878 A1* 8/2002 Ishizawa .............. B41J 2/17526 174/250
2008/0129797 A1* 6/2008 Isozaki ................ B41J 2/17513 347/14
2014/0063140 A1 3/2014 Shimizu et al.
2018/0272731 A1* 9/2018 Kimura .................... B41J 29/13
2019/0315128 A1* 10/2019 Mita .......................... B41J 2/18
2021/0291537 A1* 9/2021 Tow ..................... B41J 2/17553

FOREIGN PATENT DOCUMENTS

JP 2014-061691 A 4/2014

* cited by examiner

*Primary Examiner* — Jason S Uhlenhake
(74) *Attorney, Agent, or Firm* — WORKMAN NYDEGGER

(57) ABSTRACT

A liquid container connected to a liquid ejection apparatus for ejecting a liquid, includes a container for containing liquid and a filter section for collecting foreign matter, an injection port for injecting the liquid into the container and a lead out port for leading out the liquid from the container are opened in the container, and the filter part is positioned in the injection port.

14 Claims, 26 Drawing Sheets

LIQUID CONTAINER

The present application is based on, and claims priority from JP Application Serial Number 2021-161387, filed Sep. 30, 2021, the disclosure of which is hereby incorporated by reference herein in its entirety.

BACKGROUND

1. Technical Field

The present disclosure relates to a liquid container.

2. Related Art

JP-A-2014-61691 describes a liquid container that is connected to a liquid ejection apparatus. The liquid container includes a container that contains liquid. An injection port through which a liquid is injected is opened in the container. The liquid container is continuously used by injecting liquid into the liquid container through the injection port.

When liquid is injected into the liquid container through the injection port described in JP-A-2014-61691, there is a risk that foreign matter will enter the container.

SUMMARY

A liquid container that solves the above-described problem is to be connected to a liquid ejection apparatus configured to eject liquid, and includes a container configured to contain liquid and a filter section configured to collect foreign matter, wherein an injection port for injecting liquid into the container and a lead out port for leading liquid out from the container are opened in the container and the filter section is located in the injection port.

DESCRIPTION OF EMBODIMENTS

Hereinafter, an embodiment of a liquid container to be connected to a liquid ejection apparatus will be described with reference to the drawings. First, the liquid ejection apparatus will be described. The liquid ejection apparatus is, for example, an ink jet printer that records an image such as a character or a photograph by ejecting ink, which is an example of liquid, onto a medium such as paper or fabric.

Figure 1:
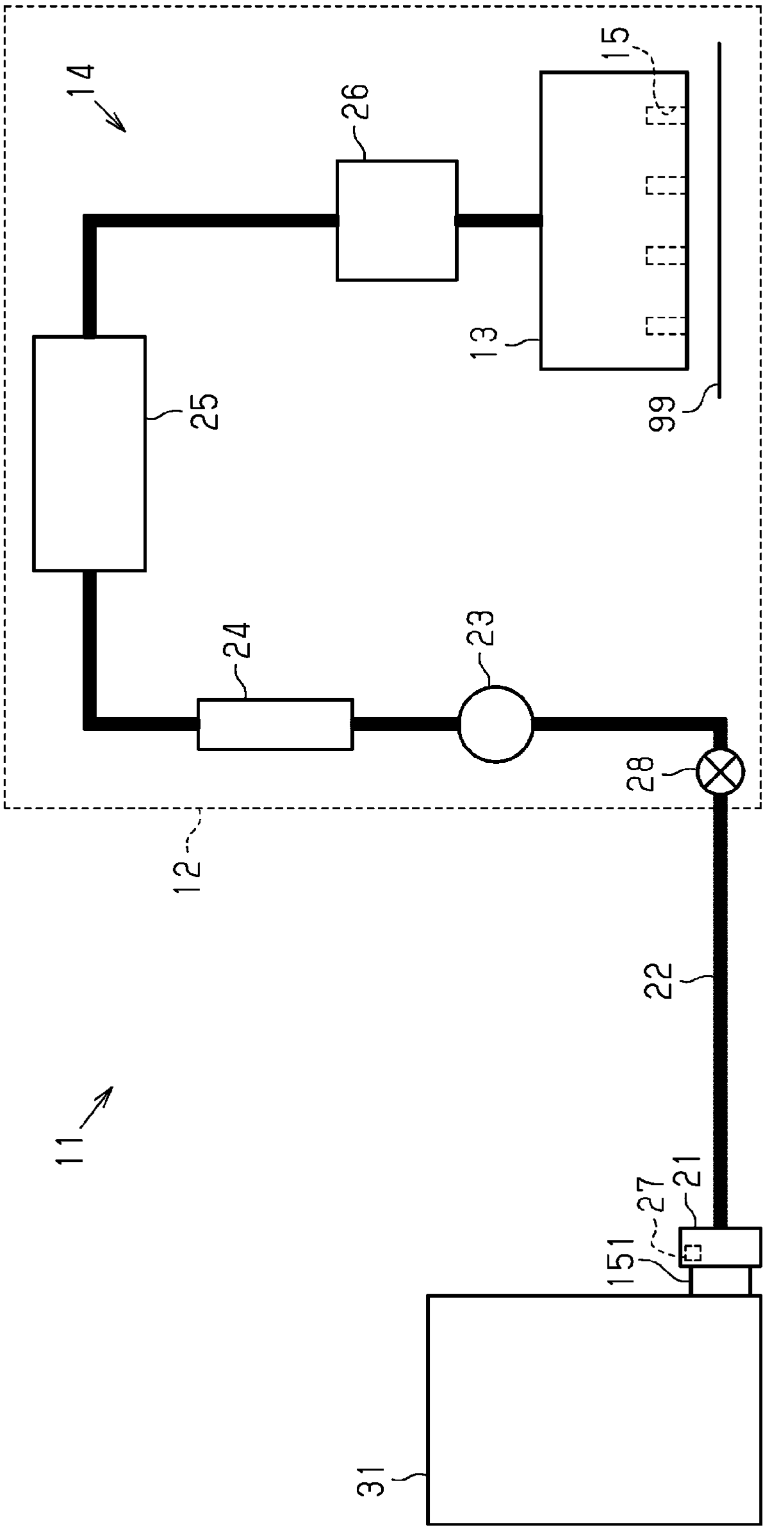
FIG. 1 is a schematic view of a liquid ejection apparatus and a liquid container.
Figure 2:
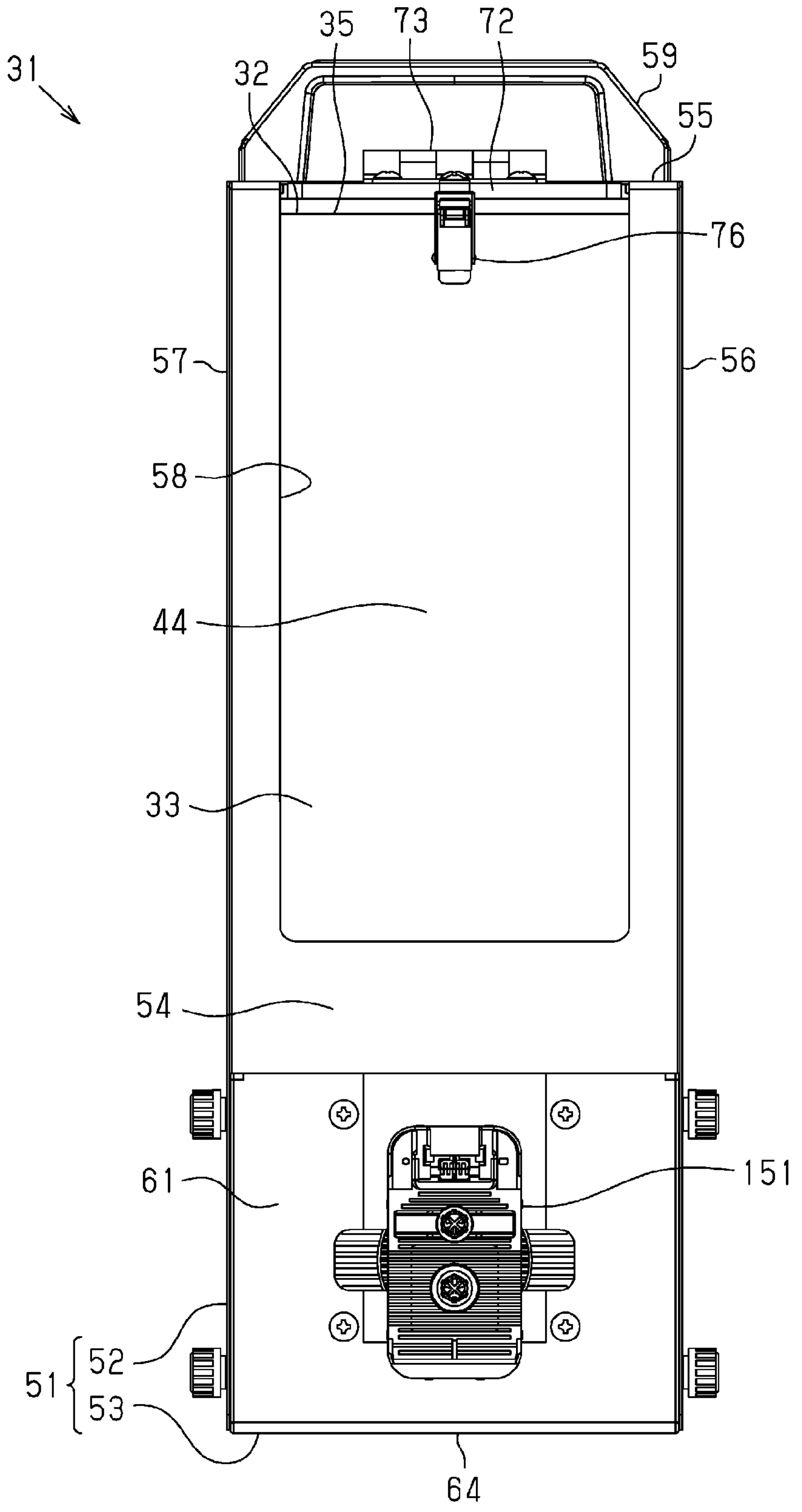
FIG. 2 is a front view of a liquid container.
Figure 3:
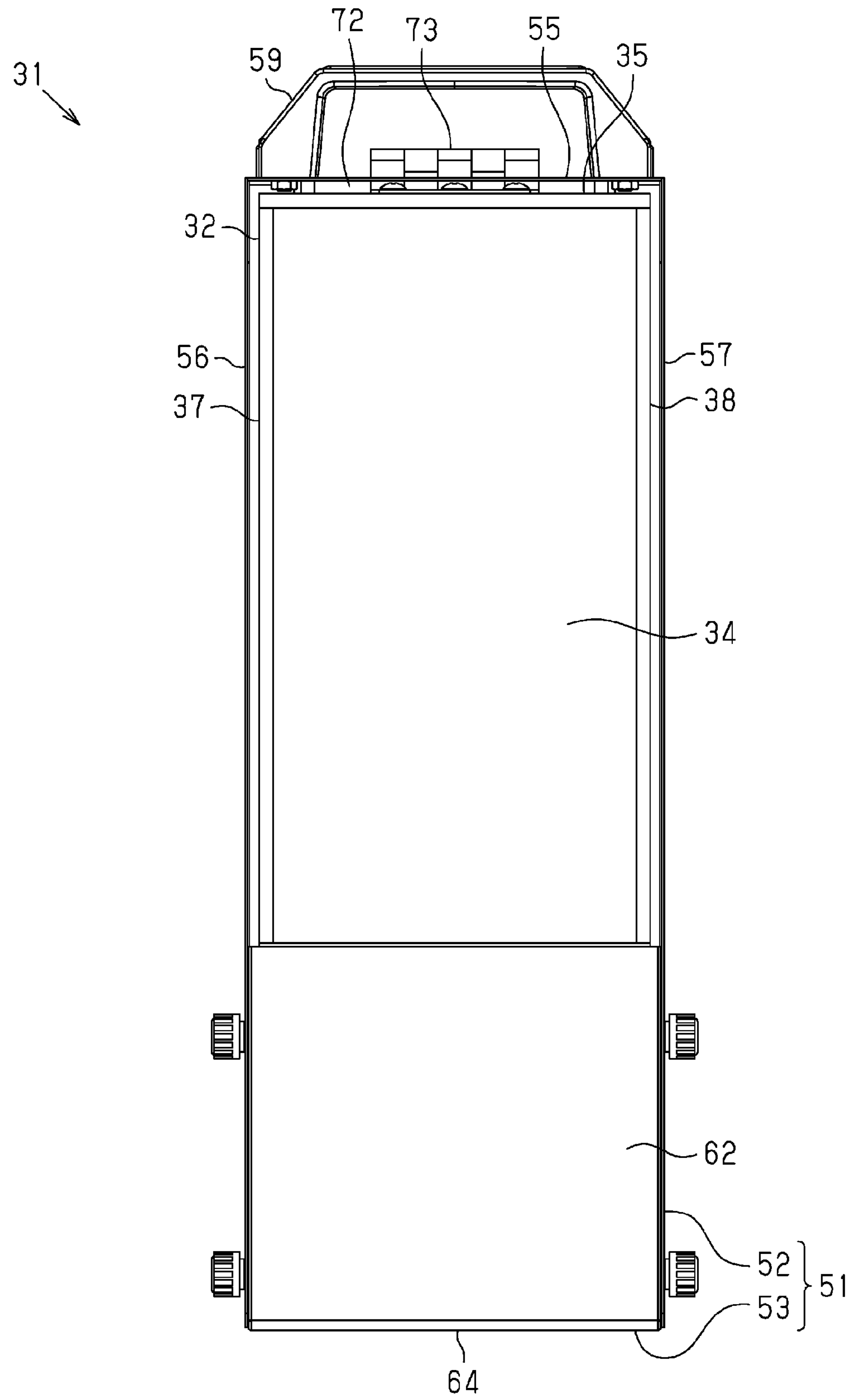
FIG. 3 is a rear view of the liquid container.
Figure 4:
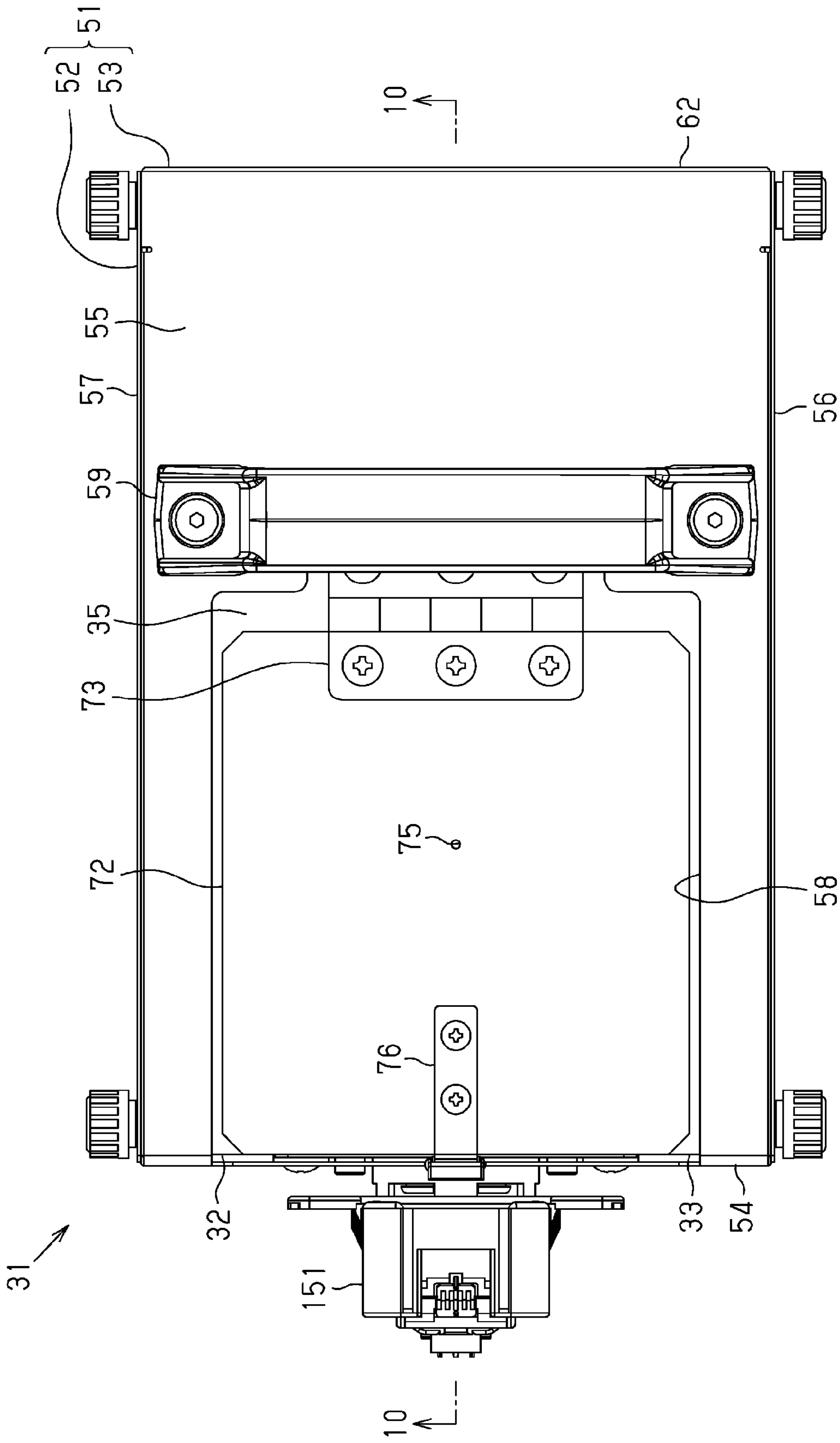
FIG. 4 is a top view of the liquid container.
Figure 5:
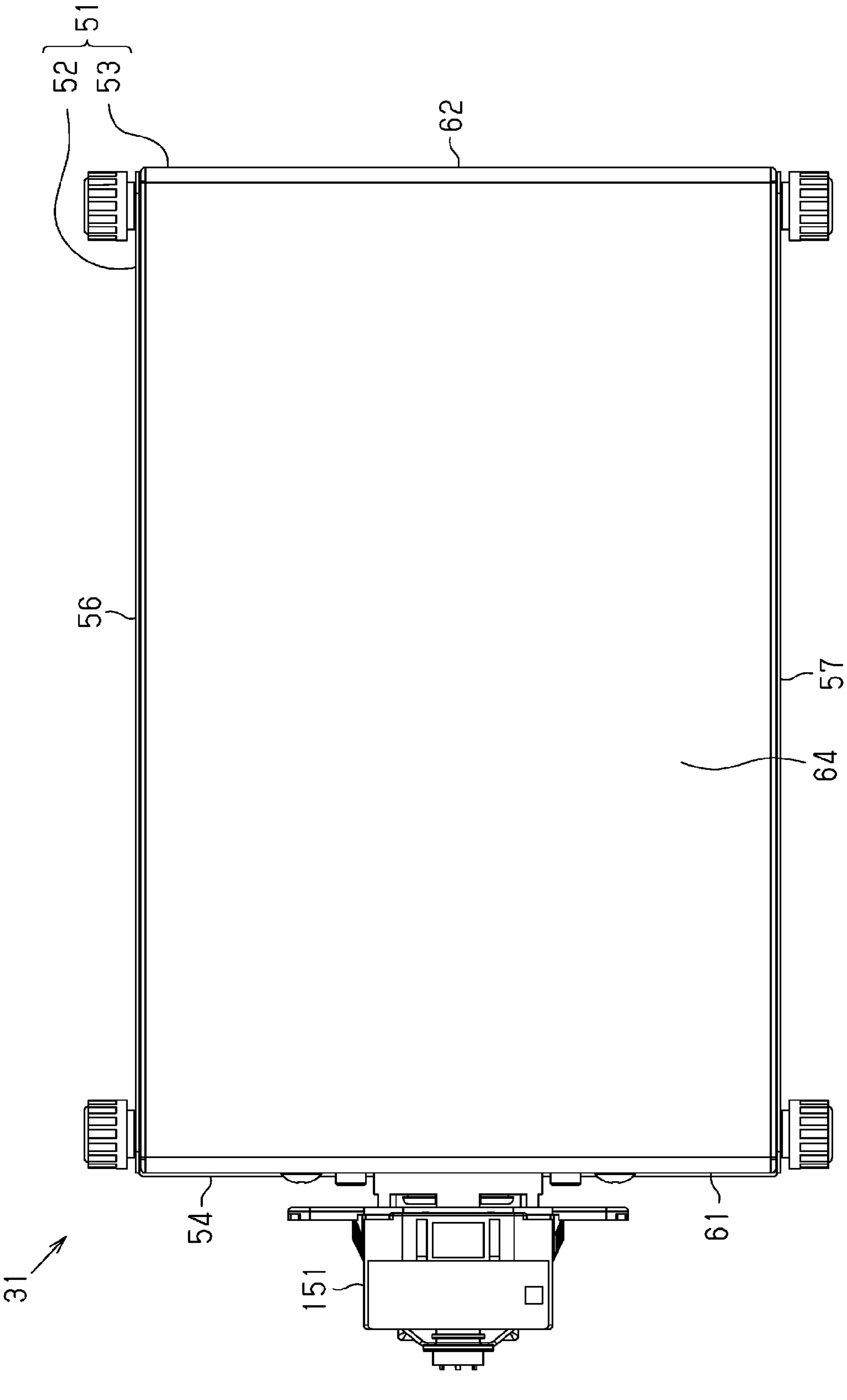
FIG. 5 is a bottom view of the liquid container.
Figure 6:
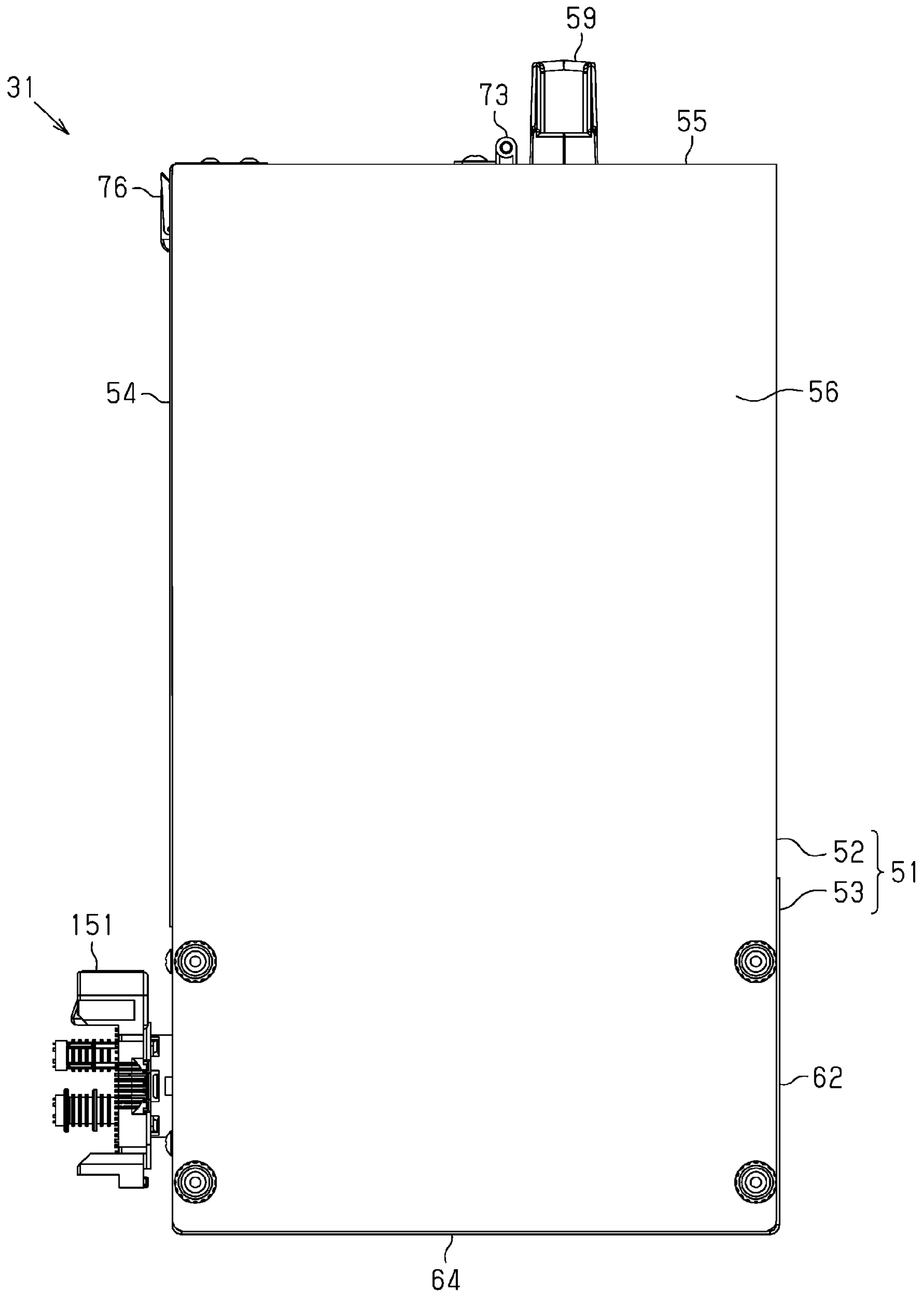
FIG. 6 is a right side view of the liquid container.
Figure 7:
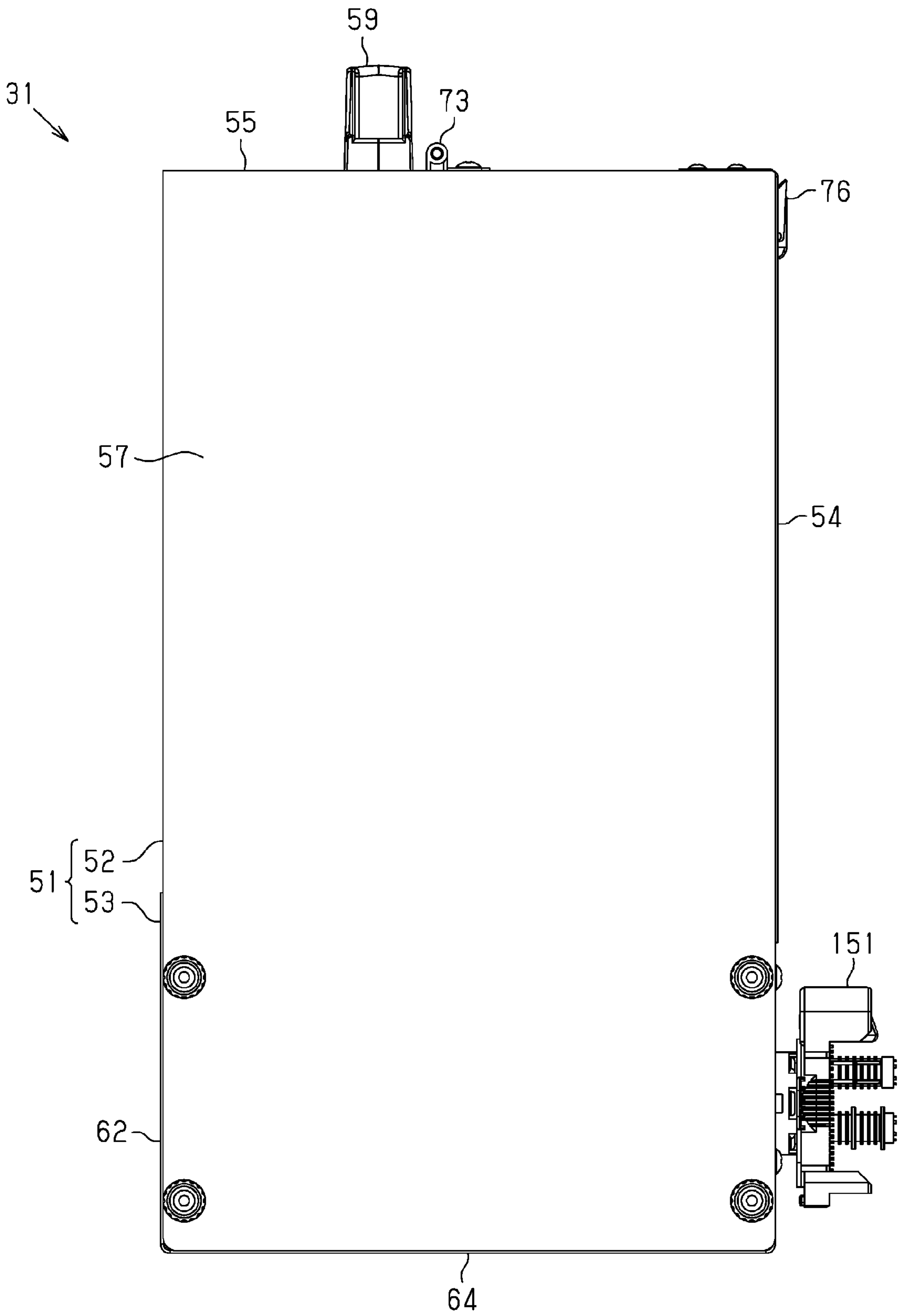
FIG. 7 is a left side view of the liquid container.

As shown in FIG. 1, a liquid ejection apparatus 11 is connected to a liquid container 31. The liquid ejection apparatus 11 includes a housing 12, an ejection section 13, and a supply mechanism 14.

The ejection section 13 is housed in the housing 12. The ejection section 13 is configured to eject liquid. The ejection section 13 is, for example, a head. The ejection section 13 has one or more nozzles 15. The ejection section 13 ejects liquid from the nozzle 15 to a medium 99.

The supply mechanism 14 is configured to supply liquid from the liquid container 31 to the ejection section 13. The supply mechanism 14 includes, for example, a connection body 21, a supply pipe 22, a pump 23, a degassing module 24, a storage section 25, and a pressure regulating valve 26.

The connection body 21 is configured to be connectable to the liquid container 31. When the connection body 21 is connected to the liquid container 31, the liquid can be supplied from the liquid container 31 to the ejection section 13. In this example, the connection body 21 is located outside the housing 12. The connection body 21 may be located inside the housing 12.

The connection body 21 has a connection section 27. The connection section 27 is a functional portion for detecting connection between the liquid container 31 and the connection body 21. The connection section 27 is, for example, a terminal that is electrically connected to the liquid container 31.

The supply pipe 22 is configured to allow a liquid to flow therethrough. The supply pipe 22 includes, for example, a tube. The supply pipe 22 is connected to the connection body 21 and to the ejection section 13. In this example, the supply pipe 22 extends inside and outside the housing 12. The supply pipe 22 may extend only within the housing 12. That is, the entire supply pipe 22 may be accommodated in the housing 12.

The pump 23 is located at the supply pipe 22. The pump 23 is for example located between the connection body 21 and the degassing module 24. The pump 23 is located, for example, within the housing 12. The pump 23 is driven to feed the liquid from the liquid container 31 toward the ejection section 13. The pump 23 is, for example, a diaphragm pump.

The degassing module 24 is located at the supply pipe 22. The degassing module 24 is, for example, located between the pump 23 and the storage section 25. The degassing module 24 is located, for example, within the housing 12. The degassing module 24 is configured to degas liquid flowing through supply pipe 22. The degassing module 24 removes air bubbles from the liquid by, for example, applying a negative pressure to the liquid.

The storage section 25 is located at the supply pipe 22. The storage section 25 is located, for example, between the degassing module 24 and the pressure regulating valve 26. The storage section 25 is located, for example, within the housing 12. The storage section 25 is configured to store a liquid. The storage section 25 may be configured to supply the stored liquid. For example, the storage section 25 may send the stored liquid to the ejection section 13 by applying pressure to the stored liquid.

The pressure regulating valve 26 is located at the supply pipe 22. The pressure regulating valve 26 is located, for example, between the storage section 25 and the ejection section 13. The pressure regulating valve 26 is located, for example, within the housing 12. The pressure regulating valve 26 opens and closes according to the pressure in the ejection section 13. The pressure regulating valve 26 opens when the pressure in the ejection section 13 is equal to or lower than a predetermined pressure. In this case, the liquid flows from the storage section 25 to the ejection section 13. When the liquid flows into the ejection section 13, the pressure in the ejection section 13 increases. The pressure regulating valve 26 closes when the pressure in the ejection section 13 exceeds the predetermined pressure. In this case, the liquid does not flow from the storage section 25 to the ejection section 13. By this, the pressure in the ejection section 13 is adjusted.

The supply mechanism 14 may have one or more supply valves 28. The supply valve 28 is located at the supply pipe 22. The supply valve 28 is situated, for example, between the connection body 21 and the pump 23. The supply valve 28 is located, for example, within the housing 12. The supply valve 28 may be located outside the housing 12.

When the supply valve 28 is closed, liquid is not supplied from the liquid container 31 to the liquid ejection apparatus 11. When the supply valve 28 is open, liquid is supplied from the liquid container 31 to the liquid ejection apparatus 11. When the supply mechanism 14 includes a plurality of supply valves 28, the plurality of supply valves 28 may be disposed between the connection body 21 and the pump 23, and also, for example, between the degassing module 24 and the storage section 25, or between the storage section 25 and the pressure regulating valve 26.

Next, the liquid container 31 will be described.

The liquid container 31 is configured to contain liquid. The liquid container 31 is connected to the liquid ejection apparatus 11. Specifically, the liquid container 31 is connected to the connection body 21. The liquid container 31 can also be detached from the connection body 21. The liquid container 31 is freely detachable from the connection body 21.

In the present example, the connection body 21 is connected to the forward facing surface of the liquid container 31. In a state in which the connection body 21 is connected to the liquid container 31, the direction from the liquid container 31 toward the connection body 21 is forward. A surface of the liquid container 31 to which the connection body 21 is connected is the forward facing surface of the liquid container 31.

In this example, the liquid container 31 is located outside the housing 12. Therefore, the liquid container 31 is connected to the connection body 21 to the outside of the housing 12. In this example, the liquid container 31 is connected to the connection body 21 at a position separated from the housing 12. The liquid container 31 may be located inside the housing 12. For example, the liquid container 31 may be accommodated inside the housing 12 and then connected to the connection body 21.

As shown in FIGS. 2, 3, 4, 5, 6, and 7, in this example, the shape of the liquid container 31 is a rectangular parallelepiped shape. In this example, the height is the largest among the width, depth, and height of the liquid container 31.

Figure 8:
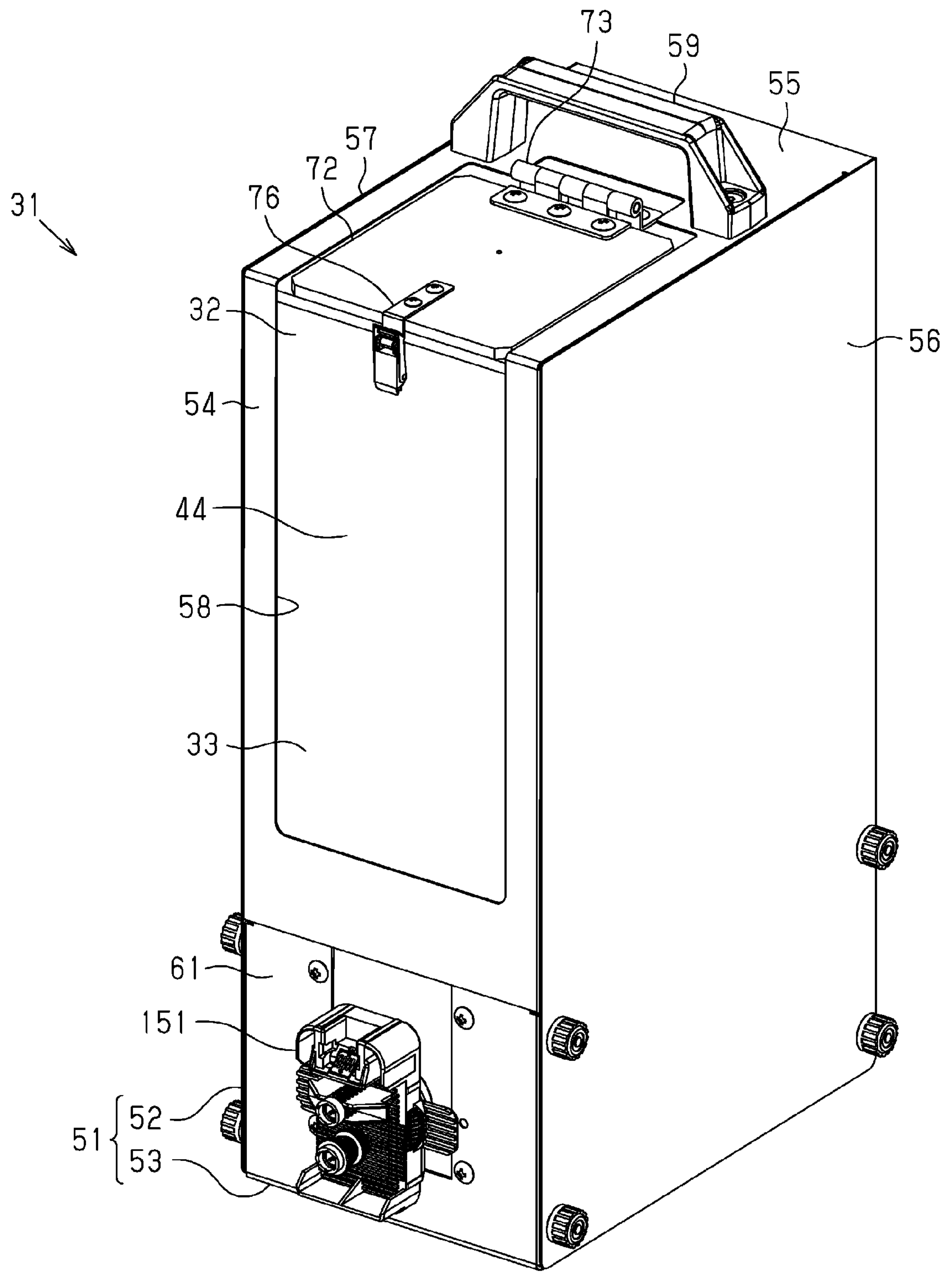
FIG. 8 is a perspective view of the liquid container.

As shown in FIG. 8, the liquid container 31 includes a container 32. The container 32 contains liquid.

Figure 9:
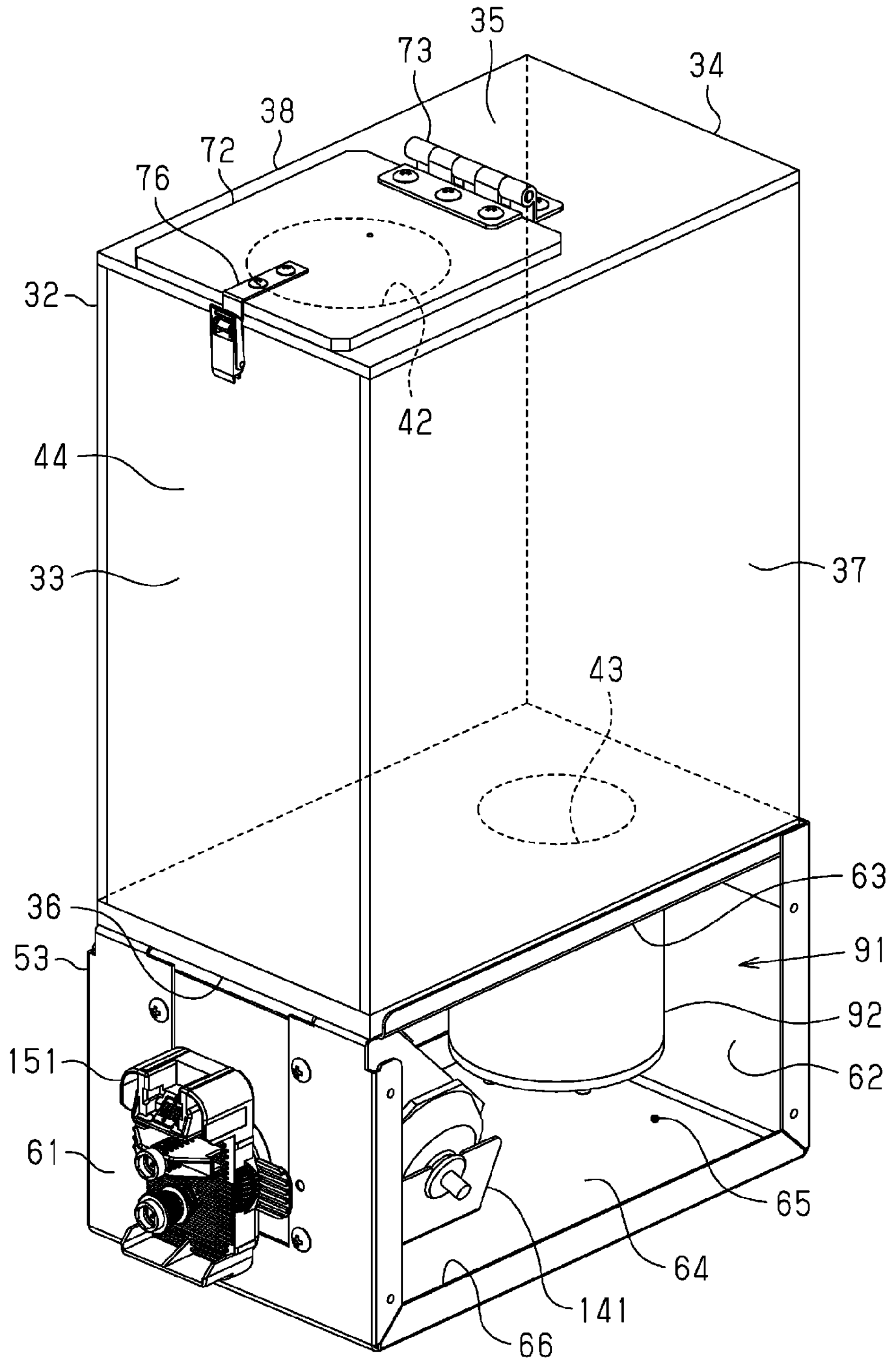
FIG. 9 is a perspective view of FIG. 8 with the cover removed.

As shown in FIG. 9, in this example, the container 32 has a rectangular parallelepiped shape. As such, the container 32 has a front wall 33, a rear wall 34, a upper wall 35, a lower wall 36, a right side wall 37 and a left side wall 38.

The front wall 33 is a wall located at the forward side of the container 32. The front wall 33 is the opposite wall from the rear wall 34. The front wall 33 is connected to the upper wall 35, the lower wall 36, the right side wall 37, and the left side wall 38. In this example, the front wall 33 constitutes a surface of the liquid container 31 that faces forward.

The rear wall 34 is a wall located at the rearward side of the container 32. The rear wall 34 is the opposite wall from the front wall 33. The rear wall 34 is connected to the upper wall 35, the lower wall 36, the right side wall 37, and the left side wall 38.

The upper wall 35 is a wall located at an upper side in the container 32. The upper wall 35 is the opposite wall from the lower wall 36. The upper wall 35 is connected to the front wall 33, the rear wall 34, the right side wall 37, and the left side wall 38.

The lower wall 36 is a wall located at a lower side in the container 32. The lower wall 36 is the opposite wall from the upper wall 35. The lower wall 36 is connected to the front wall 33, the rear wall 34, the right side wall 37, and the left side wall 38.

The right side wall 37 is a wall located on the right side of the container 32 as the front wall 33 is viewed from the front. The right side wall 37 is the opposite wall from the left side wall 38. The right side wall 37 is connected to the front wall 33, the rear wall 34, the upper wall 35, and the lower wall 36.

The left side wall 38 is a wall located on the left side of the container 32 as the front wall 33 is viewed from the front. The left side wall 38 is the opposite wall from the right side wall 37. The left side wall 38 is connected to the front wall 33, the rear wall 34, the upper wall 35, and the lower wall 36.

Figure 10:
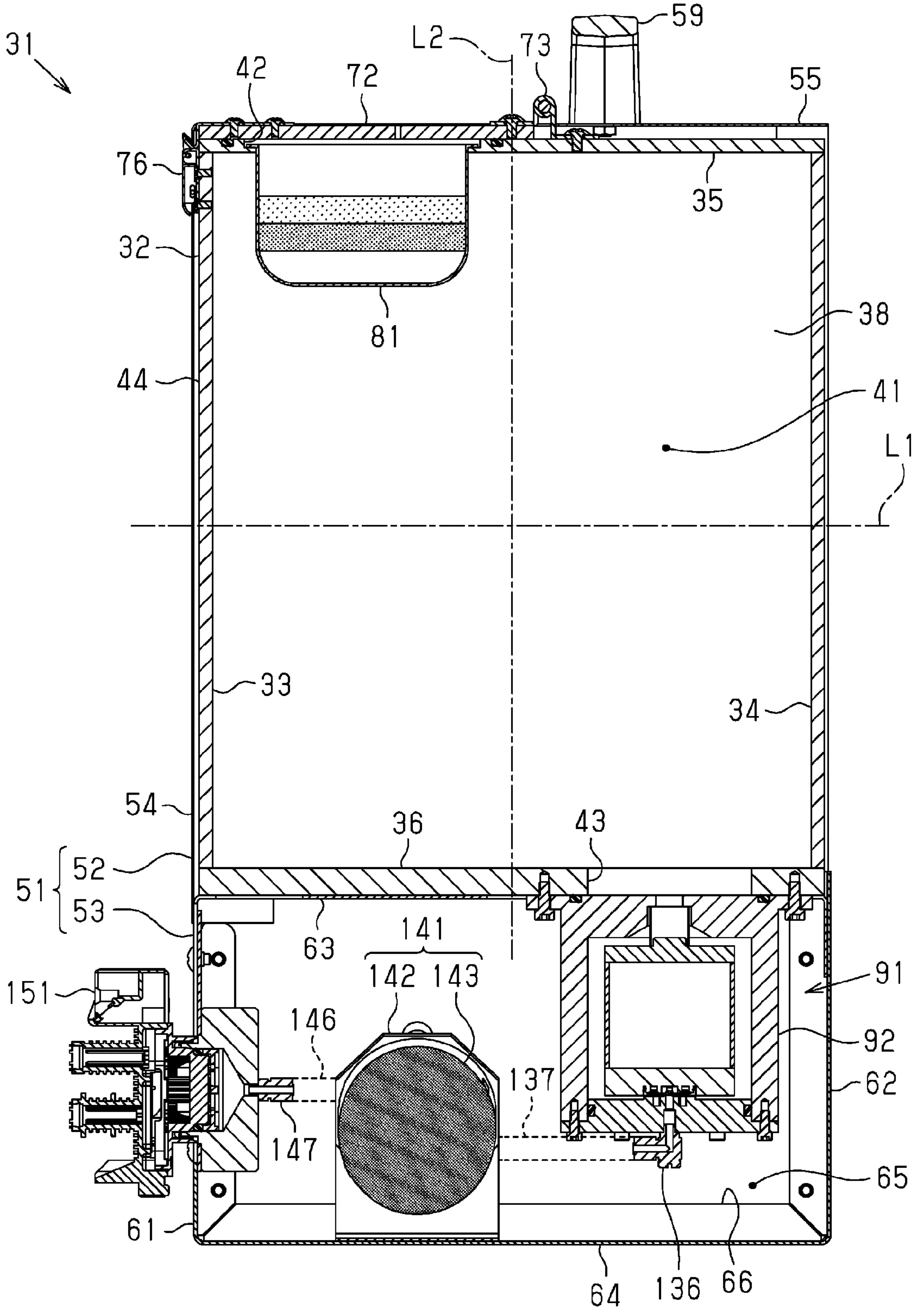
FIG. 10 is a cross-sectional view taken along line 10-10 of FIG. 4.

As shown in FIG. 10, the container 32 has an accommodation chamber 41 the stores liquid. The accommodation chamber 41 is a space in the container 32 defined by the front wall 33, the rear wall 34, the upper wall 35, the lower wall 36, the right side wall 37, and the left side wall 38.

As shown in FIGS. 9 and 10, an injection port 42 is opened in the container 32. The injection port 42 is an opening for injecting liquid into the container 32. Liquid is injected into the accommodation chamber 41 through the injection port 42. Accordingly, the user can continuously use the liquid container 31.

The injection port 42 is located at the upper side of the container 32. The upper side of the container 32 refers to a position above an intermediate position between the upper wall 35 and the lower wall 36. Specifically, the upper side of the container 32 is above a first imaginary line L1 extending midway between the upper wall 35 and the lower wall 36. In this example, the injection port 42 is opened in the upper wall 35.

The injection port 42 is located at the front side of the container 32. The front side of the container 32 refers to a position forward of an intermediate position between the front wall 33 and the rear wall 34. Specifically, the front side of the container 32 is further forward than a second imaginary line L2 extending midway between the front wall 33 and the rear wall 34. In this example, the injection port 42 is open at the front side of the upper wall 35.

A lead out port 43 is opened in the container 32. The lead out port 43 is an opening for leading the liquid out from the container 32. The liquid is led from the accommodation chamber 41 through the lead out port 43.

The lead out port 43 is located at the lower side of the container 32. The lower side of the container 32 refers to a position below the intermediate position between the upper wall 35 and the lower wall 36. Specifically, the lower side of the container 32 is lower than the first imaginary line L1. In this example, the lead out port 43 is opened in the lower wall 36.

The lead out port 43 is located at the rear side of the container 32. The rear side of the container 32 refers to a position further rearward than an intermediate position between the front wall 33 and the rear wall 34. Specifically, the rear side of the container 32 is further rearward than the second imaginary line L2. In this example, the lead out port 43 is opened at the rear side of the lower wall 36.

The container 32 has a visual check section 44. The visual check section 44 is a functional portion for visually checking the liquid level of the liquid contained in the container 32. The user can grasp the remaining amount of liquid contained in the container 32 by visually checking the liquid level through the visual check section 44.

The visual check section 44 is constituted by a transparent or translucent portion in the container 32. In this example, the visual check section 44 is located on the front wall 33. Thus, at least the front wall 33 of the container 32 is transparent or translucent. In this example, not only the front wall 33 but also the entire container 32 is transparent or translucent.

The container 32 is made of, for example, a transparent or translucent resin material. The container 32 is manufactured, for example, by blow molding. The container 32 need not be manufactured by blow molding but may also be manufactured by other methods, such as injection molding and extrusion molding.

As shown in FIG. 8, the liquid container 31 includes a protection member 51. The protection member 51 protects the container 32 by surrounding the container 32. In this example, the protection member 51 has a cover 52 and a frame 53. The cover 52 and the frame 53 may be integral.

In this example, the cover 52 is fixed to the frame 53. In this example, the cover 52 is screwed to the frame 53. The cover 52 is attachable to and detachable from the frame 53.

In the case where the cover 52 is fixed to the frame 53, the force applied to the cover 52 is less likely to be transmitted to the container 32 than in the case where the cover 52 is fixed to the container 32. For example, when the cover 52 is deformed, stress due to the deformation is not easily transmitted to the container 32. When the cover 52 is fixed to the frame 53, it is not necessary to perform a process on the container 32 for fixing the cover 52, as compared to the case where the cover 52 is fixed to the container 32. Therefore, the rigidity of the container 32 is maintained. Therefore, the container 32 is appropriately protected by the protection member 51.

The cover 52 is configured to cover the container 32. The cover 52 is formed of, for example, sheet metal. In this example, the cover 52 has a front plate 54, an upper plate 55, a right plate 56 and a left plate 57.

The front plate 54 is a plate located at the front side of the cover 52. The front plate 54 is connected to the upper plate 55, the right plate 56, and the left plate 57. The front plate 54 opposes the front wall 33. In this example, the front plate 54 constitutes a surface of the liquid container 31 facing forward.

The upper plate 55 is a plate located at the upper part of the cover 52. The upper plate 55 is connected to the front plate 54, the right plate 56, and the left plate 57. The upper plate 55 opposes the upper wall 35.

The right plate 56 is a plate located to the right side of the cover 52 as the front plate 54 is viewed from the front. The right plate 56 is a plate that opposes the left plate 57. The right plate 56 is connected to the front plate 54 and the upper plate 55. The right plate 56 opposes the right side wall 37. In this example, the right plate 56 is fixed to the frame 53.

The left plate 57 is a plate located to the left side of the cover 52 as the front plate 54 is viewed from the front. The left plate 57 is a plate that opposes the right plate 56. The left plate 57 is connected to the front plate 54 and the upper plate 55. The left plate 57 opposes the left side wall 38. In this example, the left plate 57 is fixed to the frame 53.

The cover 52 covers the container 32 so as to expose at least the visual check section 44. In this example, the cover 52 covers the container 32 so as to expose at least a portion of the front wall 33. An exposure port 58 for exposing the front wall 33 is opened in the cover 52. In this example, since the entire container 32 is transparent or translucent, a portion of the front wall 33 exposed from the exposure port 58 functions as the visual check section 44. The user visually checks the liquid level of the liquid contained in the container 32 through the exposure port 58.

In this example, since the cover 52 does not cover the rear wall 34, the rear wall 34 is exposed. Therefore, in this example, the user can also visually check the liquid level of the liquid contained in the container 32 through the rear wall 34.

In this example, the exposure port 58 exposes not only the visual check section 44 but also the injection port 42. That is, in this example, the exposure port 58 exposes the front wall 33 and the upper wall 35. Therefore, the exposure port 58 is opened across the front plate 54 and the upper plate 55. The opening for exposing the visual check section 44 and the opening for exposing the injection port 42 may be separate.

The cover 52 may have a grip section 59 for a user to grip. This makes it easy for the user to transport the liquid container 31. In this example, the grip section 59 is attached to the upper plate 55. The grip section 59 is located at the rear side of the upper plate 55. That is, the grip section 59 is located on the upper plate 55 behind the second imaginary line L2.

As shown in FIG. 9, the frame 53 supports the container 32 from below. The frame 53 is located below the container 32. Since the frame 53 supports the container 32, the posture of the liquid container 31 is stabilized.

The frame 53 is formed of, for example, sheet metal. In this example, the frame 53 has an attachment plate 61, a protection plate 62, a top plate 63, and a bottom plate 64.

Figure 11:
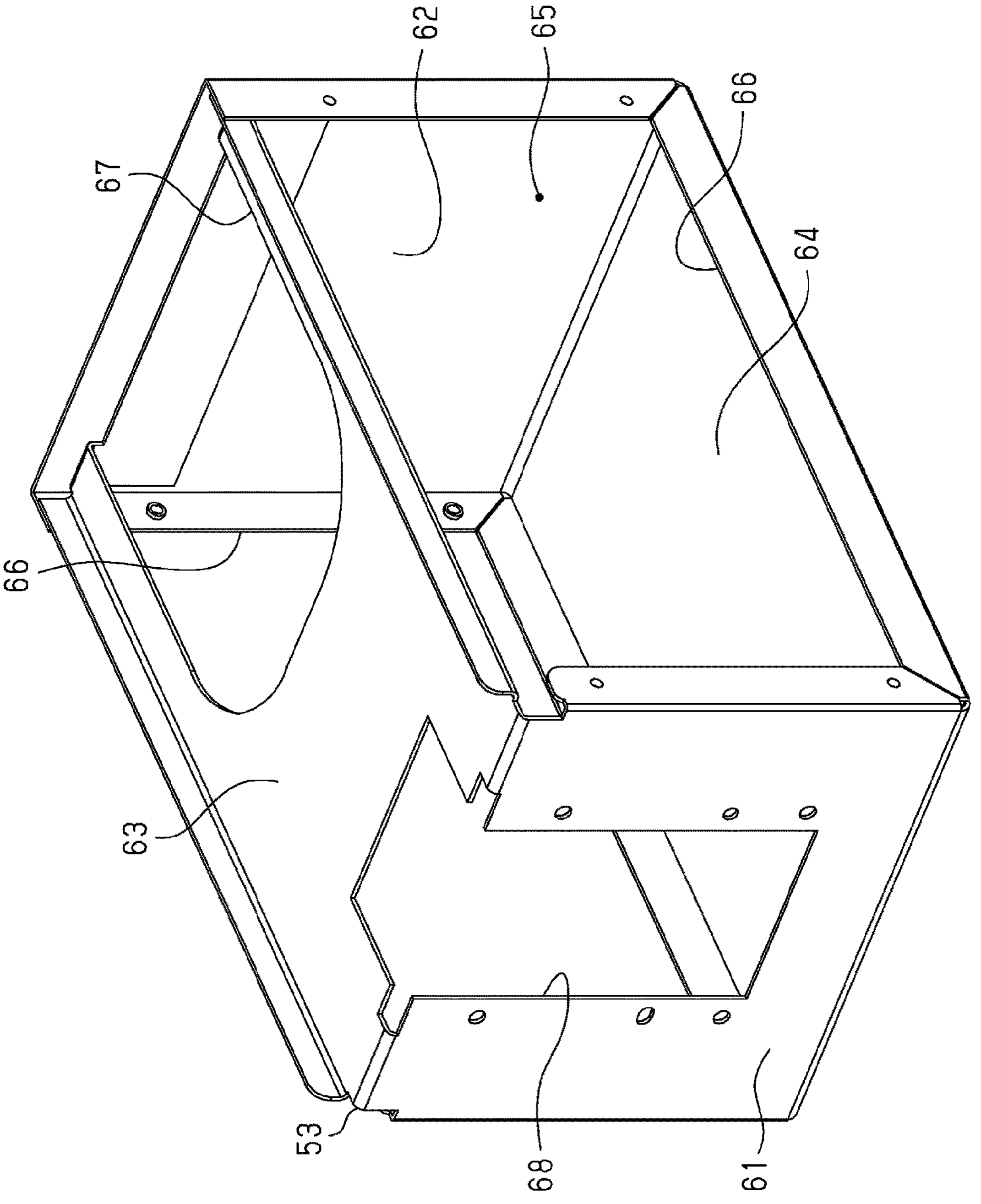
FIG. 11 is a perspective view of a frame.

As shown in FIGS. 9 and 11, the attachment plate 61 is located at front of the frame 53. The attachment plate 61 is opposite from the protection plate 62. The attachment plate 61 is connected to the top plate 63 and the bottom plate 64. In this example, the attachment plate 61 constitutes a forward facing surface of the liquid container 31.

The attachment plate 61 is a plate to which a lead out section 151, to be described later, is attached. The attachment plate 61 is located below the front wall 33. The attachment plate 61 extends so as to be continuous with the front wall 33. The attachment plate 61 is located below the front plate 54. The attachment plate 61 extends so as to be continuous with the front plate 54.

The protection plate 62 is located at the rear side of the frame 53. The protection plate 62 is opposite from the attachment plate 61. The protection plate 62 is connected to the top plate 63 and the bottom plate 64. The protection plate 62 is located below the rear wall 34. The protection plate 62 extends so as to be continuous with the rear wall 34.

The top plate 63 is located at the upper part of the frame 53. The top plate 63 is opposite to the bottom plate 64. The top plate 63 is connected to the attachment plate 61 and the protection plate 62. The container 32 is placed on the top plate 63. That is, the top plate 63 contacts the container 32. The top plate 63 opposes the lower wall 36.

The bottom plate 64 is located at the lower side of the frame 53. The bottom plate 64 is a plate opposite to the top plate 63. The bottom plate 64 is connected to the attachment plate 61 and the protection plate 62.

The frame 53 defines an accommodation space 65 below the container 32. The accommodation space 65 is a space defined by the attachment plate 61, the protection plate 62, the top plate 63, and the bottom plate 64. The accommodation space 65 is a space accessible from the outside. The accommodation space 65 is located directly below the container 32. Configuration of the liquid container 31 is located in the accommodation space 65.

As shown in FIG. 11, one or more openings 66 are formed in the frame 53. In this example, two openings 66 are opened in the frame 53. The openings 66 are openings defined by the attachment plate 61, the protection plate 62, the top plate 63, and the bottom plate 64. The accommodation space 65 communicates with the openings 66. A user can access the accommodation space 65 through the openings 66.

In this example, when the cover 52 is attached to the frame 53, the two openings 66 are closed by the right plate 56 and the left plate 57, respectively. That is, in this example, the cover 52 covers the accommodation space 65. Therefore, in this example, it is necessary to remove the cover 52 from the frame 53 in order for the user to access the accommodation space 65. In other words, the configuration located in the accommodation space 65 is protected by the cover 52.

An insertion port 67 is opened in the frame 53. The insertion port 67 is opened in the top plate 63. In this example, the insertion port 67 is opened at the rear side of the top plate 63. In a state where the container 32 is placed on the frame 53, the insertion port 67 overlaps with the lead out port 43.

An attachment port 68 is opened in the frame 53. The attachment port 68 is opened in the attachment plate 61. The attachment port 68 is an opening to which the lead out section 151 is attached.

Figure 12:
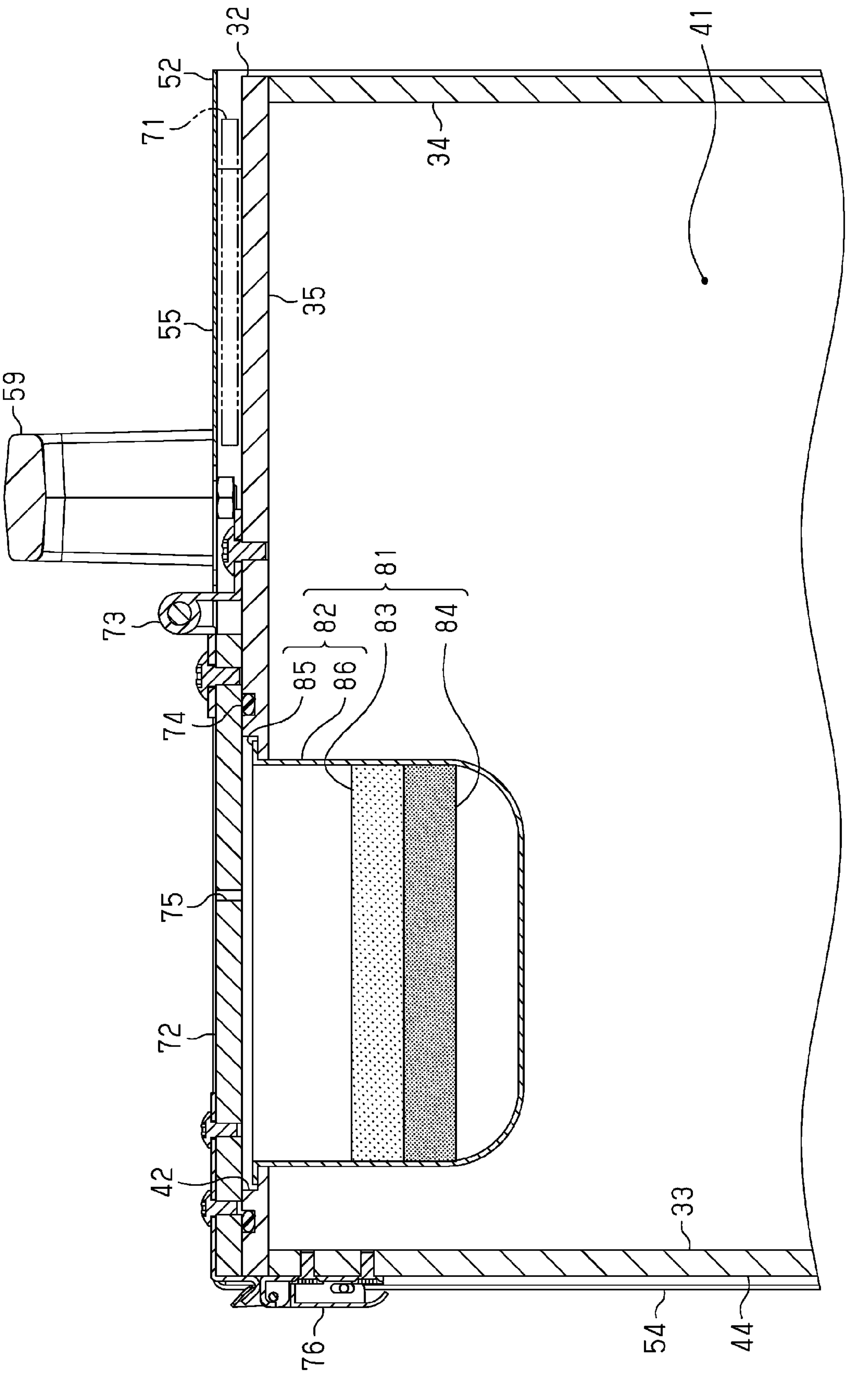
FIG. 12 is an enlarged view of the upper part of FIG. 10.

As shown in FIG. 12, the liquid container 31 may include buffer material 71. The buffer material 71 is located, for example, between the container 32 and the cover 52. In this example, the buffer material 71 is located between the upper wall 35 and the upper plate 55.

Usually, the cover 52 is manufactured to be larger than the container 32 in consideration of manufacturing errors, attachment errors, and the like. Therefore, a gap may be formed between the container 32 and the cover 52. When a gap is formed between the container 32 and the cover 52, the container 32 may move inside the cover 52. In this respect, the buffer material 71 reduces the risk of the container 32 moving within the cover 52. In addition, the buffer material 71 makes it difficult for vibration, impact, and the like to transmit from the cover 52 to the container 32.

The liquid container 31 may include a protection lid 72. The protection lid 72 is attached to the container 32, for example. In this example, the protection lid 72 is attached to the upper wall 35. The protection lid 72 is attached to the upper wall 35 by means of a hinge 73.

The protection lid 72 opens and closes with respect to the container 32. The protection lid 72 closes the injection port 42 by closing. Thus, the protection lid 72 protects the injection port 42. When the protection lid 72 is opened, the injection port 42 is exposed. In this case, the user can inject the liquid through the injection port 42.

The liquid container 31 may include a seal ring 74. The sealing ring 74 is located between the container 32 and the protection lid 72. In this example, the sealing ring 74 is attached to the container 32. Specifically, the seal ring 74 is attached to the upper wall 35 so as to surround the injection port 42.

The sealing ring 74 seals the container 32 and the protection lid 72 when the protection lid 72 is closed. This reduces the possibility that foreign matter will enter the injection port 42 while the protection lid 72 is closed.

An atmosphere opening port 75 may be opened in the container 32 or the protection lid 72. The atmosphere opening port 75 is an opening that opens the accommodation chamber 41 to atmosphere. By opening the accommodation chamber 41 to atmosphere, the liquid in the accommodation chamber 41 is smoothly led out through the lead out port 43. In particular, the atmosphere opening port 75 is useful when the container 32 and the protection lid 72 are sealed by the seal ring 74. In this example, the atmosphere opening port 75 is opened in the protection lid 72.

The liquid container 31 may include a lock mechanism 76. The lock mechanism 76 is a mechanism for locking the closed protection lid 72 to the container 32. The lock mechanism 76 is attached to the container 32 and the protection lid 72. Since the lock mechanism 76 locks the protection lid 72, the possibility that the protection lid 72 will be unintentionally opened is reduced.

The liquid container 31 includes a filter section 81. The filter section 81 is attached to the container 32. The filter section 81 can also be removed from the container 32. The filter section 81 is attachable to and detachable from the container 32. The filter section 81 is located at the injection port 42.

The filter section 81 is configured to collect foreign matter. The filter section 81 reduces the risk of foreign matter entering the container 32 from the injection port 42. The filter section 81 includes, for example, a holding member 82 and one or more filters. In this example, the filter section 81 includes a holding member 82, a first filter 83, and a second filter 84.

When liquid is injected from the injection port 42, the liquid passes through the filter section 81. The liquid injected from the injection port 42 passes through the first filter 83 and the second filter 84 in this order. Thus, in this example, the first filter 83 is a primary filter. The second filter 84 is a secondary filter through which the liquid that has passed through the primary filter passes. Foreign matter is removed from the liquid by passing the liquid through one or more filters.

The holding member 82 holds the first filter 83 and the second filter 84. The holding member 82 is fitted into the injection port 42. The holding member 82 is configured to allow liquid to pass therethrough. In this example, the holding member 82 is a mesh filter made of stainless steel. Therefore, in this example, the holding member 82 also functions as a tertiary filter. The liquid passing through the first filter 83 and the second filter 84 passes through the tertiary filter.

The holding member 82 has an edge portion 85 and a protruding portion 86. The edge portion 85 is in contact with an edge defining the injection port 42 in the upper wall 35. The holding member 82 is attached to the container 32 by hooking the edge portion 85 onto the upper wall 35. The protruding portion 86 is continuous with the edge portion 85. The protruding portion 86 is a portion that protrudes from the edge portion 85 into the container 32. Therefore, the protruding portion 86 is located in the accommodation chamber 41.

One or more filters are accommodated in the protruding portion 86. That is, the protruding portion 86 holds the first filter 83 and the second filter 84. In this example, the first filter 83 and the second filter 84 are located above the bottom of the protruding portion 86. Therefore, the liquid that has passed through the first filter 83 and the second filter 84 passes through the bottom of the protruding portion 86.

The first filter 83 is, for example, a sponge filter. The first filter 83 is the first filter in the filter section 81 that contacts the liquid injected through the injection port 42. In the present example, the first filter 83 is located above the second filter 84.

The second filter 84 is, for example, a sponge filter. The second filter 84 is a filter in the filter section 81 that contacts the liquid that has passed through the first filter 83. The second filter 84 is located below the first filter 83. In this example, the second filter 84 is stacked with the first filter 83.

The mesh size of the primary filter is coarser than the mesh size of the secondary filter. In this example, the mesh size of the first filter 83 is coarser than the mesh size of the second filter 84. That is, the filtration particle size of the first filter 83 is larger than the filtration particle size of the second filter 84. Filtration particle size refers to, for example, a particle size at which when standard particles having a known particle size are filtered, a collection rate of standard particles is 99% or more. For example, the filtration particle size of the first filter 83 is 70 micrometers. For example, the filtration particle size of the second filter 84 is 13 micrometers.

The smaller the filtration particle size of the filter, the finer the foreign matter that is collected. On the other hand, the smaller the filtration particle size of the filter, the larger the pressure loss when the liquid passes through the filter. That is, the smaller the filtration particle size of the filter, the more difficult it is for the liquid to pass through the filter. In a filter, there is a trade-off between filtration particle size and pressure drop.

When it is difficult for the liquid to pass through the filter, the injection of the liquid is delayed. If it is difficult for the liquid to pass through the filter, the liquid may accumulate in the filter. In this case, there is a risk that the injected liquid will bounce off the filter. When the liquid rebounds from the filter, the liquid may scatter around the injection port 42.

In this example, when liquid is injected through the injection port 42, the liquid first contacts the first filter 83. Since the mesh of the first filter 83 is coarse, the liquid easily passes through the first filter 83. Therefore, the liquid does not accumulate in the first filter 83. This reduces the possibility that the injected liquid will scatter.

The liquid that has passed through the first filter 83 contacts the second filter 84. Since the mesh of the second filter 84 is fine, fine foreign matter is collected by the second filter 84. That is, the second filter 84 collects the foreign matter that has passed through the first filter 83.

Since the mesh of the second filter 84 is fine, the injected liquid may accumulate in the second filter 84. The speed of the injected liquid attenuates by passing through the first filter 83. Therefore, even when the liquid accumulates in the second filter 84, there is little possibility that the liquid bounces off the second filter 84. Further, even if the liquid bounces off the second filter 84, the liquid can be caught by the first filter 83. Therefore, the liquid is less likely to scatter around the injection port 42.

The mesh size of the holding member 82 functioning as the tertiary filter may be larger than the mesh size of the first filter 83 or smaller than the mesh size of the second filter 84. The mesh size of the holding member 82 may be finer than the mesh of the first filter 83 and coarser than the mesh of the second filter 84. In a case where the mesh size of the holding member 82 is finer than the mesh size of the second filter 84, the filter section 81 can collect finer foreign matter.

As shown in FIG. 10, the liquid container 31 includes a lead out mechanism 91. The lead out mechanism 91 is a mechanism that leads the liquid out from the container 32 to the connection body 21. The lead out mechanism 91 is connected to the lead out port 43 and the connection body 21.

The lead out mechanism 91 has a valve section 92. The valve section 92 is configured to be openable and closable. The valve section 92 controls the flow of liquid by opening and closing. When the valve section 92 is opened, liquid can be led out from the container 32 to the connection body 21. When the valve section 92 is closed, the liquid cannot be led out from the container 32 to the connection body 21.

In this example, the valve section 92 is attached to the container 32. Specifically, the valve section 92 is attached to the lower wall 36. The valve section 92 is attached so as to overlap with the lead out port 43. That is, the valve section 92 is attached to the rear side of the lower wall 36. The valve section 92 is not limited to being directly connected to the container 32, and may be connected to the container 32 via a tube, for example. The valve section 92 is located in the accommodation space 65 through the insertion port 67. That is, the valve section 92 is accommodated in the frame 53.

The valve section 92 is configured to open and close according to the remaining amount of liquid contained in the container 32. For example, the valve section 92 closes when the remaining amount of liquid contained in the container 32 is zero or very small. This reduces the possibility that air will flow from the liquid container 31 to the liquid ejection apparatus 11. In this example, the valve section 92 is a float valve that automatically opens and closes in accordance with the remaining amount of liquid contained in the container 32.

Figure 13:
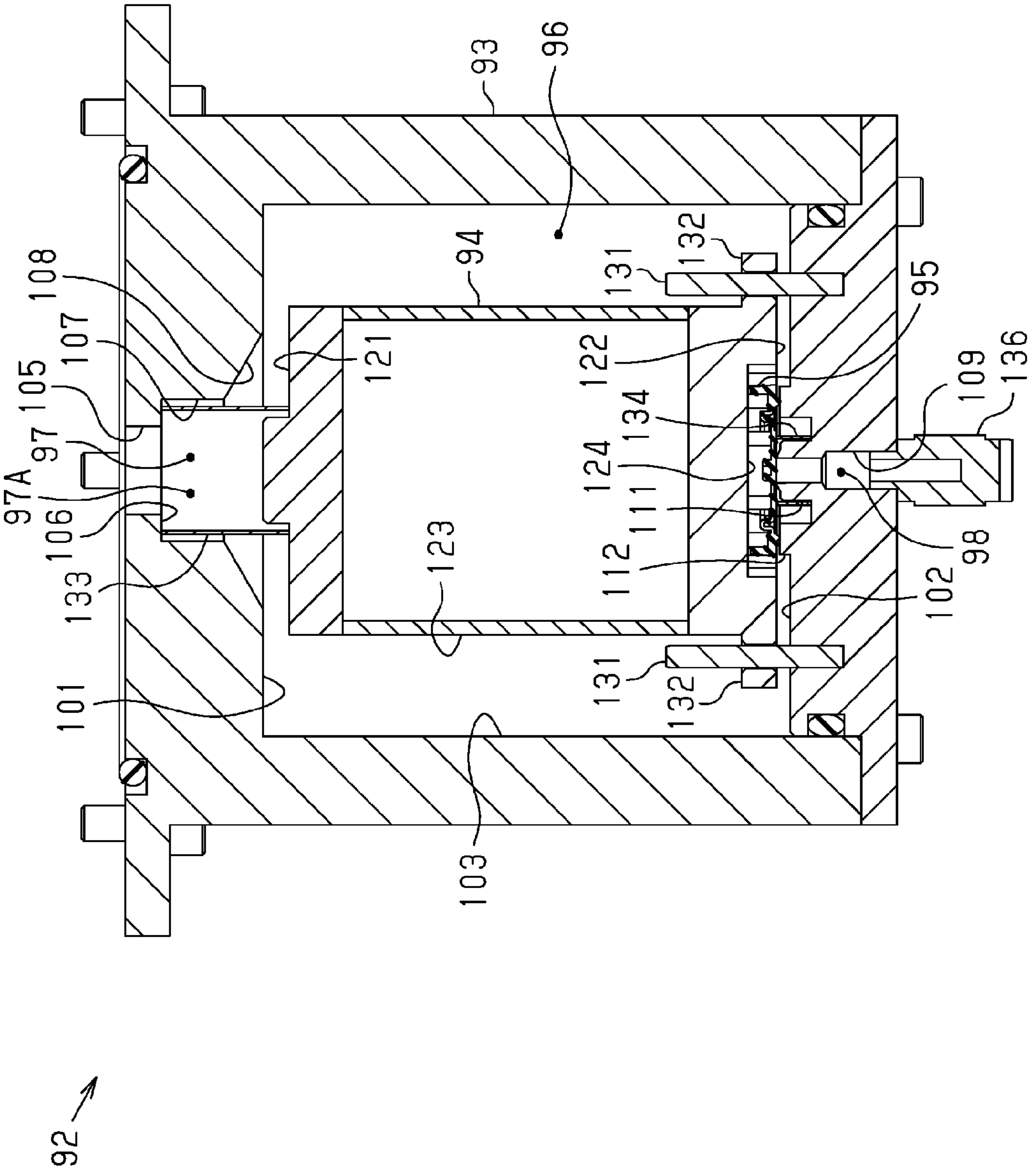
FIG. 13 is a cross-sectional view of a valve section.

As shown in FIG. 13, the valve section 92 includes a holder 93, a float 94, and a seal member 95.

The holder 93 has a cylindrical shape. The holder 93 houses the float 94 and the seal member 95. The liquid flows from the container 32 to the connection body 21 by passing through the holder 93.

The holder 93 has a liquid chamber 96, an inflow path 97, and an outflow path 98. The liquid chamber 96 is a space in which the float 94 and the seal member 95 are accommodated. The liquid chamber 96 communicates with the inflow path 97 and the outflow path 98. Liquid flows into the liquid chamber 96 through the inflow path 97. Liquid flows out from the liquid chamber 96 through the outflow path 98.

The liquid chamber 96 is defined by an inflow surface 101, an outflow surface 102, and an inner peripheral surface

103. The inflow surface 101, the outflow surface 102, and the inner peripheral surface 103 are surfaces that the holder 93 has inside.

The inflow surface 101 is a surface on which the inflow path 97 opens. The inflow surface 101 is located above the outflow surface 102.

The outflow surface 102 is a surface in which the outflow path 98 is opened. The outflow surface 102 is located below the inflow surface 101. The float 94 moves between the inflow surface 101 and the outflow surface 102. Specifically, the float 94 moves so as to approach the inflow surface 101 and to approach the outflow surface 102.

The inner peripheral surface 103 is connected to the inflow surface 101 and the outflow surface 102. The inner peripheral surface 103 extends in a circular shape when the holder 93 is viewed from above. In other words, the liquid chamber 96 has a cylindrical shape when the holder 93 is viewed from above.

Figure 14:
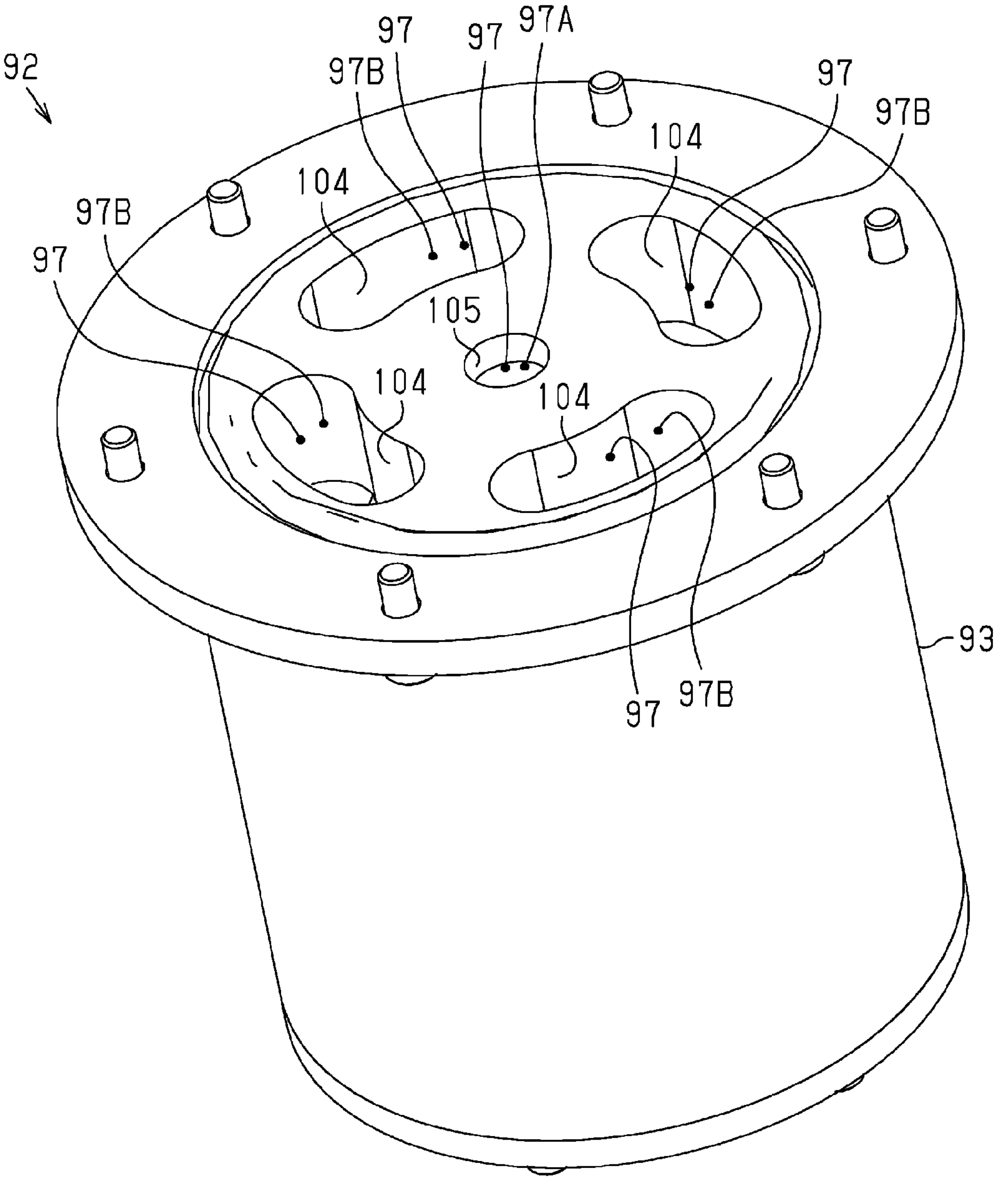
FIG. 14 is a perspective view of the valve section.
Figure 15:
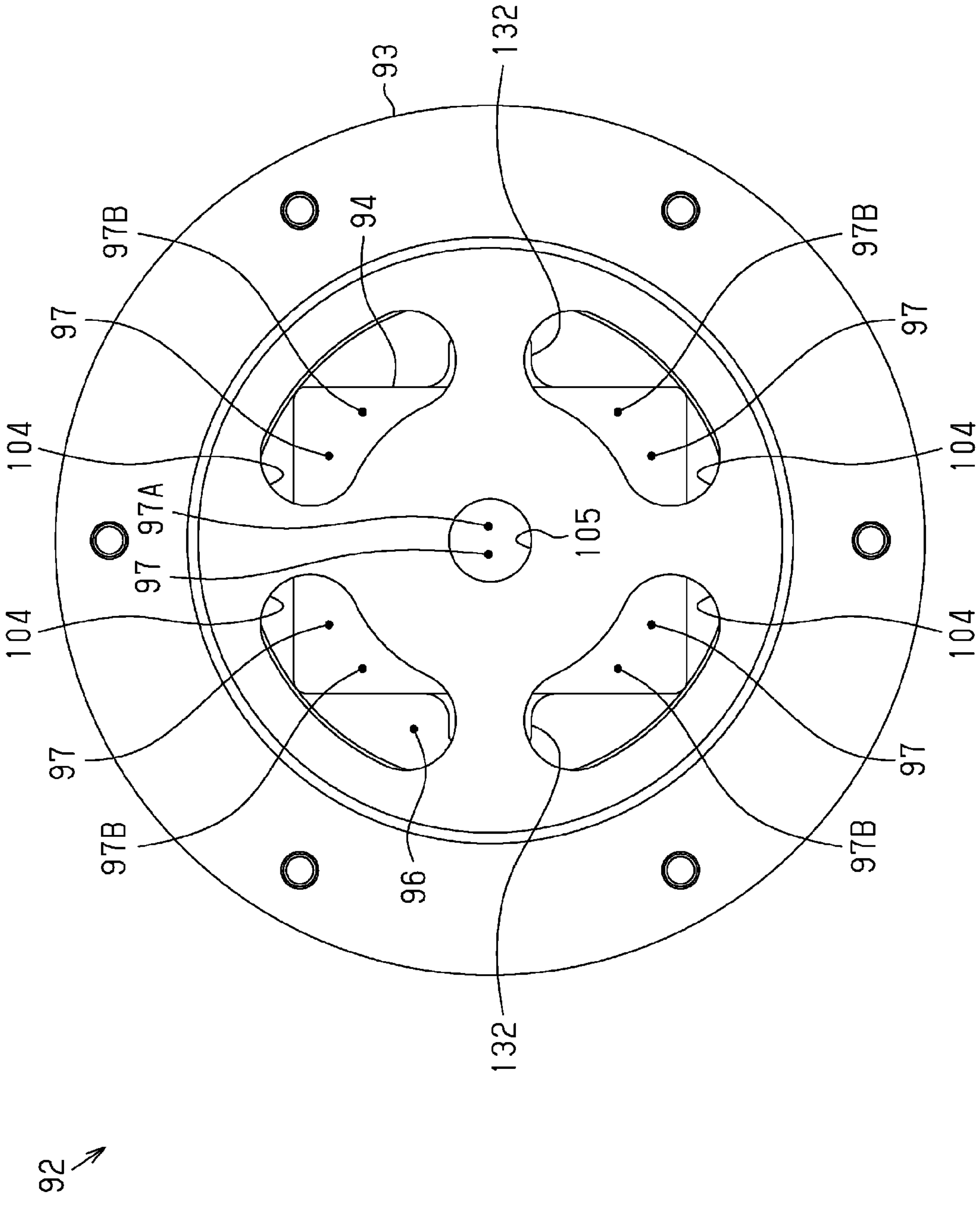
FIG. 15 is a top view of the valve section.

As shown in FIGS. 14 and 15, in this embodiment, the holder 93 has two kinds of inflow paths 97. Specifically, the holder 93 has a first inflow path 97A and second inflow paths 97B. In this example, there is one first inflow path 97A and four second inflow paths 97B.

The first inflow path 97A is located at the center when the holder 93 is viewed from above. Four second inflow paths 97B are located around the first inflow path 97A when the holder 93 is viewed from above. The first inflow path 97A and the second inflow paths 97B each communicate with the lead out port 43.

The plurality of second inflow paths 97B are defined by a plurality of forming surfaces 104. The plurality of forming surfaces 104 are surfaces included in the holder 93. The plurality of forming surfaces 104 are each continuous with the inflow surface 101.

As shown in FIG. 13, the first inflow path 97A is defined by a first inner surface 105, a stepped surface 106, a second inner surface 107, and an inclined surface 108. The first inner surface 105, the stepped surface 106, the second inner surface 107, and the inclined surface 108 are surfaces included in the holder 93.

The first inner surface 105, the stepped surface 106, the second inner surface 107, and the inclined surface 108 are connected in this order from the lead out port 43 toward the liquid chamber 96. That is, the first inner surface 105 is continuous with the step surface 106. The stepped surface 106 is continuous with the first inner surface 105 and the second inner surface 107. The second inner surface 107 is continuous with the stepped surface 106 and the inclined surface 108. The inclined surface 108 is continuous with the second inner surface 107 and the inflow surface 101.

The first inflow path 97A extends so as to increase in cross-sectional area from the lead out port 43 toward the liquid chamber 96. Therefore, when the holder 93 is viewed from above, the diameter of the circle formed by the first inner surface 105 is smaller than the diameter of the circle formed by the second inner surface 107. The inclined surface 108 is inclined so that the cross-sectional area of the first inflow path 97A increases from the lead out port 43 toward the liquid chamber 96.

The outflow path 98 is defined by a defining surface 109. The defining surface 109 is a surface which the holder 93 has in its interior. The defining surface 109 is continuous with the outflow surface 102.

In this example, the holder 93 has a first contact portion 111 and a second contact portion 112. The first contact portion 111 and the second contact portion 112 are formed in the outflow surface 102. The first contact portion 111 and the second contact portion 112 are portions on the outflow surface 102 in contact with the seal member 95. In the present example, the first contact portion 111 and the second contact portion 112 are protruding portions on the outflow surface 102.

When the holder 93 is viewed from above, the first contact portion 111 is located on the outflow surface 102 so as to surround the outflow path 98. It can also be said that the outflow path 98 opens into the first contact portion 111. The first contact portion 111 extends in an annular shape when the holder 93 is viewed from above.

The second contact portion 112 is positioned so as to surround the first contact portion 111 on the outflow surface 102 when the holder 93 is viewed from above. The second contact portion 112 extends in an annular shape when the holder 93 is viewed from above.

The float 94 is located in the liquid chamber 96. The mass of the float 94 is less than the mass of the liquid contained in the container 32. Therefore, the float 94 floats with respect to the liquid. When the remaining amount of liquid contained in the container 32 is reduced, the liquid level lowers to the liquid chamber 96. Specifically, when the remaining amount of liquid contained in the container 32 becomes 0, the liquid level is lowered to the liquid chamber 96. The float 94 moves according to the position of the liquid level. Thus, the float 94 moves according to the residual quantity of liquid contained in the container 32. The valve section 92 is opened and closed by movement of the float 94.

The float 94 has a first opposing surface 121, a second opposing surface 122, and an outer peripheral surface 123. The first opposing surface 121 is a surface opposing the inflow surface 101. In this example, the first opposing surface 121 is an upper surface of the float 94. The second opposing surface 122 is opposed to the outflow surface 102. In this example, the second opposing surface 122 is the lower surface of the float 94. The outer peripheral surface 123 is a surface opposing the inner peripheral surface 103. The outer peripheral surface 123 is continuous with the first opposing surface 121 and the second opposing surface 122.

Figure 16:
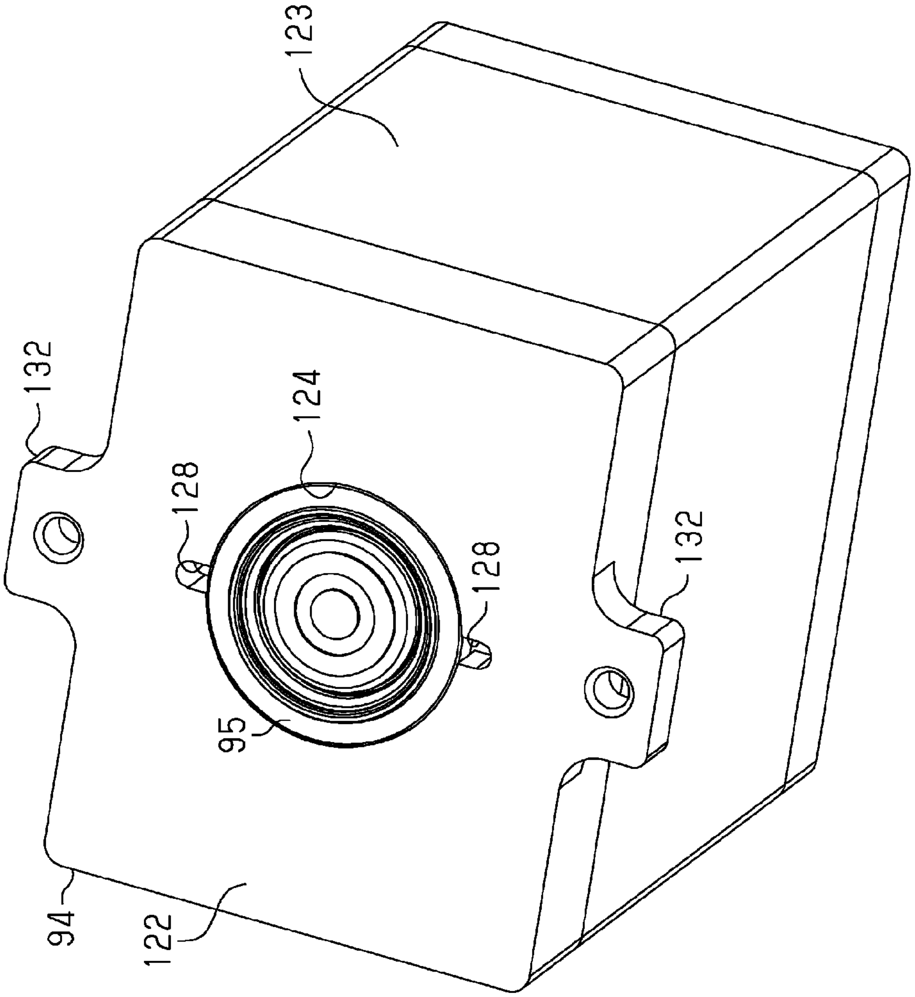
FIG. 16 is a perspective view of a float.
Figure 17:
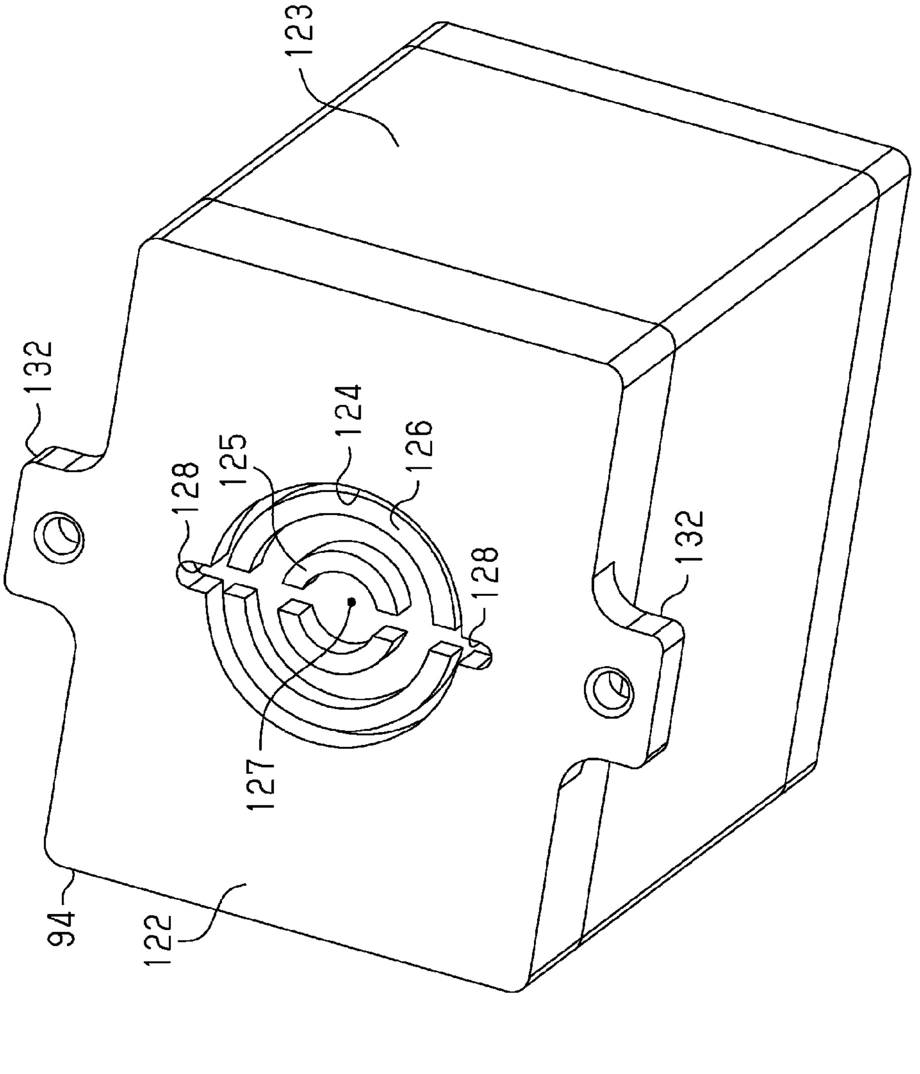
FIG. 17 is a perspective view of FIG. 16 with a sealing member is removed.

As shown in FIGS. 16 and 17, in this embodiment, the float 94 has a rectangular parallelepiped shape. The outer peripheral surface 123 extends in a rectangular shape when the float 94 is viewed from above.

The float 94 has an attachment section 124. The seal member 95 is attached to the attachment section 124. The attachment section 124 is formed on the second opposing surface 122.

The attachment section 124 includes, for example, a first rib 125 and a second rib 126. The seal member 95 is fitted into the first rib 125 and the second rib 126, whereby the seal member 95 is attached to the attachment section 124.

Figure 18:
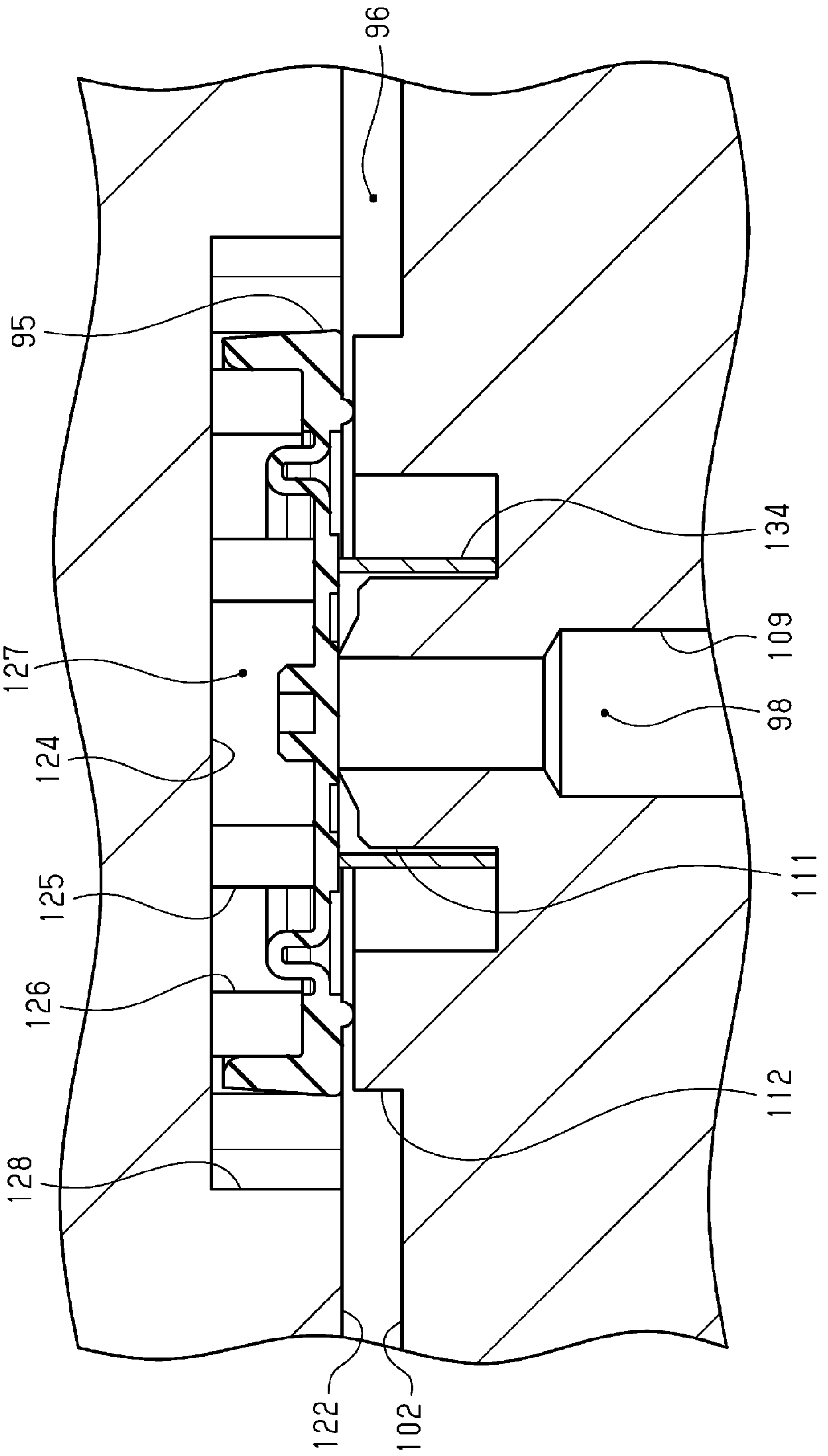
FIG. 18 is an enlarged view of FIG. 13.

As shown in FIG. 18, the attachment section 124 has a displacement space 127. The displacement space 127 is a space defined by the first rib 125 and the seal member 95. The displacement space 127 is a space in which the seal member 95 is displaced by the contact of the seal member 95 with the first contact portion 111.

When the float 94 approaches the outflow surface 102, the first contact portion 111 contacts the seal member 95 so as to push it into the attachment section 124. The seal member 95 is deformed by contact with the first contact portion 111. At this time, the seal member 95 bends so as to reduce the volume of the displacement space 127.

The posture of the float 94 may tilt in the liquid chamber 96. For example, the second opposing surface 122 may not be parallel to the outflow surface 102. When the posture of the float 94 tilts, the posture of the seal member 95 also tilts.

Therefore, there is a possibility that the first contact portion 111 cannot appropriately contact the seal member 95.

In this example, the first contact portion 111 contacts the sealing member 95 so as to push into the attachment section 124. In this case, even if the posture of the seal member 95 is tilted, the seal member 95 deforms in accordance with the first contact portion 111. Accordingly, the first contact portion 111 can appropriately come into contact with the seal member 95. That is, the seal member 95 can seal the holder 93 and the float 94. In this way, the displacement space 127 can be used to deal with tilt in the posture of the float 94.

In the absence of the displacement space 127, when the posture of the float 94 tilts, the seal member 95 does not deform even if the first contact portion 111 contacts the seal member 95. Therefore, the posture of the seal member 95 remains tilted. In this case, there is a possibility that the seal member 95 cannot seal the holder 93 and the float 94.

As shown in FIGS. 16, 17, and 18, the attachment section 124 has a retraction groove 128. The retraction groove 128 extends so as to cut across the first rib 125 and the second rib 126. The retraction groove 128 is a groove that allows the space between the seal member 95 and the attachment section 124 to communicate with the outside. The space between the seal member 95 and the attachment section 124 includes the displacement space 127.

When the seal member 95 is attached to the attachment section 124, air is discharged from the space between the seal member 95 and the attachment section 124 to the outside through the retraction groove 128. That is, the retraction groove 128 facilitates attachment of the seal member 95 to the attachment section 124. In a case where the retraction groove 128 is not provided, when the seal member 95 is attached to the attachment section 124, the space between the seal member 95 and the attachment section 124 is sealed. In this case, since air is accumulated in the space between the seal member 95 and the attachment section 124, it is difficult to attach the seal member 95 to the attachment section 124.

As shown in FIG. 13, the float 94 approaches the outflow surface 102 when the liquid level of the liquid chamber 96 drops because liquid is led out from the liquid container 31 to the liquid ejection apparatus 11. As a result, the sealing member 95 contacts the outflow surface 102. Thus, the outflow path 98 is blocked. In this way, when the liquid contained in the container 32 runs out, the valve section 92 closes the outflow path 98. In this example, the sealing member 95 is in contact with the first contact portion 111 and the second contact portion 112. That is, the seal member 95 double seals the holder 93 and the float 94. This improves the sealing performance of the seal member 95. Further, the holder 93 and the float 94 can be sealed by appropriately bringing either the first contact portion 111 or the second contact portion 112 into contact with the seal member 95. Therefore, even when the posture of the float 94 tilts, it is easy to appropriately seal the holder 93 and the float 94.

The float 94 approaches the inflow surface 101 when the liquid level in the liquid chamber 96 rises due to injection of liquid into the container 32. As a result, the sealing member 95 moves away from the outflow surface 102. Accordingly, the liquid can be led out from the liquid container 31 to the liquid ejection apparatus 11.

When liquid is stored in the container 32, the liquid chamber 96 is filled with liquid. Therefore, while liquid is contained in the container 32, the inflow surface 101 and the first opposing surface 121 stay in contact with each other. In this case, the float 94 may stick to the holder 93 due to the liquid clinging between the inflow surface 101 and the first opposing surface 121. In this regard, in the present example, the contact area between the inflow surface 101 and the first opposing surface 121 is reduced by the plurality of inflow paths 97 opened in the inflow surface 101. Also, the contact area between the inflow surface 101 and the first opposing surface 121 is reduced by the inclined surface 108. This reduces the risk of the float 94 sticking to the holder 93.

Figure 19:
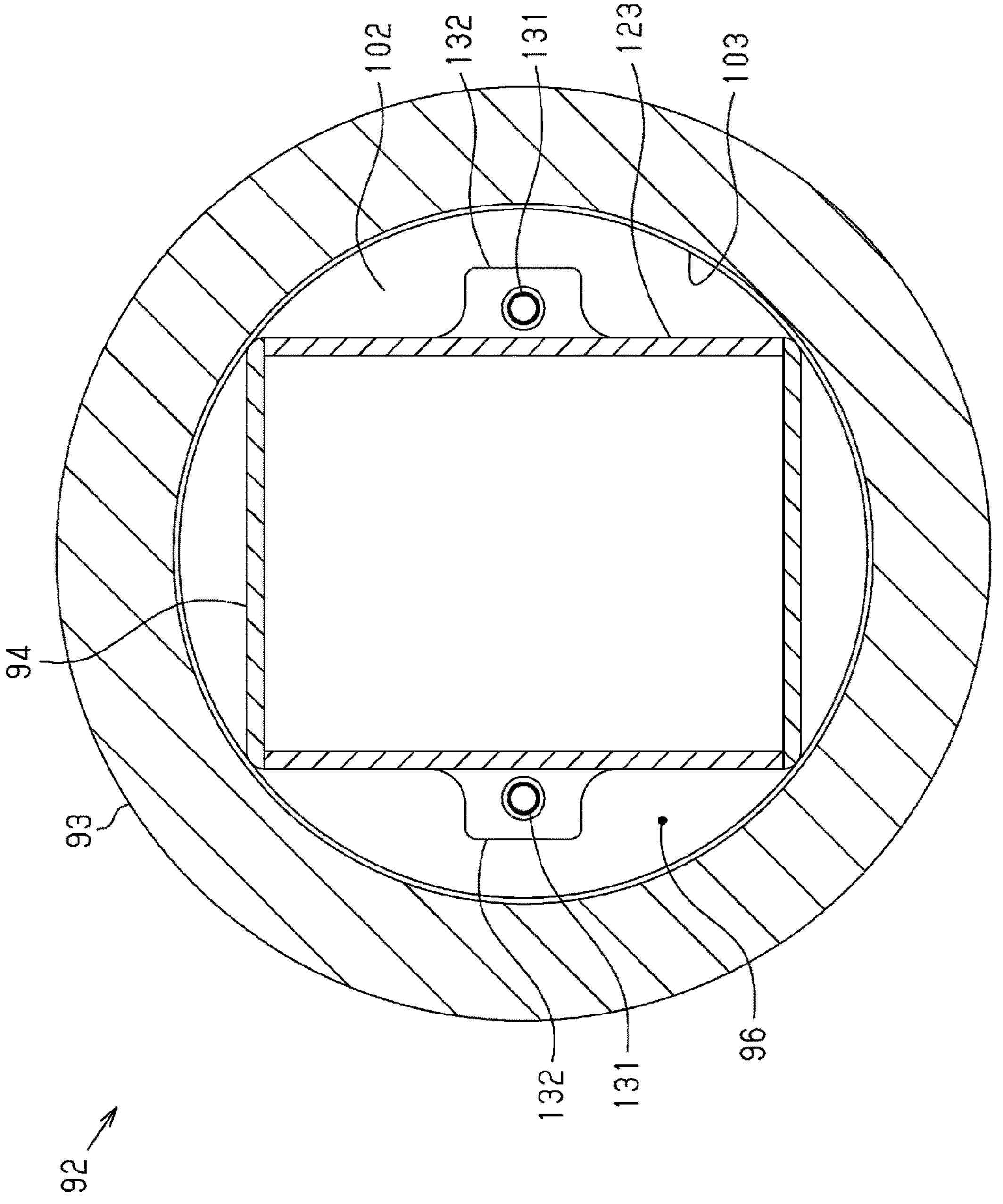
FIG. 19 is a cross-sectional view of the valve section cross sectioned in a direction different from that of FIG. 13.

As shown in FIG. 19, in this example, the outer peripheral surface 123 is in contact with the inner peripheral surface 103. Therefore, the float 94 moves while the outer peripheral surface 123 is contacted. That is, the inner peripheral surface 103 guides the movement of the float 94.

Regardless of the presence or absence of liquid contained in the container 32, the outer peripheral surface 123 remains in contact with the inner peripheral surface 103. Therefore, the float 94 may stick to the holder 93 due to liquid clinging between the outer peripheral surface 123 and the inner peripheral surface 103. In this respect, in this example, when the holder 93 is viewed from above, the inner peripheral surface 103 extends in a circular shape, whereas the outer peripheral surface 123 extends in a rectangular shape. Therefore, portions of the outer peripheral surface 123 that contact the inner peripheral surface 103 are only corner portions of the rectangle. Thus, the contact area between the outer peripheral surface 123 and the inner peripheral surface 103 is reduced as compared with, for example, a case where the outer peripheral surface 123 extends in an arched shape. This reduces the risk of the float 94 sticking to the holder 93.

When the liquid level lowers to the liquid chamber 96, air enters the liquid chamber 96. If air remains in the liquid chamber 96 even though the liquid level rose up to the accommodation chamber 41 as a result of liquid being injected into the container 32, there is a risk that the float 94 will not move normally. In this regard, in the present example, the inclined surface 108 facilitates return of air remaining in the liquid chamber 96 to the accommodation chamber 41.

As shown in FIG. 13, the valve section 92 may have a guide member 131. In this example, the valve section 92 has two guide members 131. The guide member 131 is, for example, a rod. The guide member 131 is attached to the holder 93. The guide member 131 is located in the liquid chamber 96. The guide member 131 extends from the outflow surface 102 toward the inflow surface 101. The guide member 131 guides the movement of the float 94. In this case, the float 94 has an insertion section 132 into which the guide member 131 is inserted. The insertion section 132 protrudes from the outer peripheral surface 123, for example.

The valve section 92 may have a spring. In this example, the valve section 92 has a first spring 133 and a second spring 134. The first spring 133 and the second spring 134 press the float 94 against the holder 93. This facilitates movement of the float 94. Further, the first spring 133 and the second spring 134 reduce the possibility that the float 94 will stick to the holder 93.

The first spring 133 presses the float 94 against the outflow surface 102. The first spring 133 is located between the holder 93 and the float 94. The first spring 133 is in contact with the holder 93 and the float 94. Specifically, the first spring 133 contacts the stepped surface 106 and the first opposing surface 121.

The second spring 134 presses the float 94 against the inflow surface 101. The second spring 134 is located between the holder 93 and the float 94. The second spring 134 contacts the float 94 and the sealing member 95. In detail, the second spring 134 contacts the outflow surface 102 and the sealing member 95.

As shown in FIG. 10, the lead out mechanism 91 has a first coupling 136. The first coupling 136 is attached to the valve section 92. In detail, the first coupling 136 is attached to the holder 93. The first coupling 136 is connected to an outflow path 98.

The lead out mechanism 91 has a first outlet pipe 137. The first outlet pipe 137 is, for example, a tube. The first outlet pipe 137 is connected to the first coupling 136. In this example, the first outlet pipe 137 extends through the accommodation space 65.

The lead out mechanism 91 includes a sub-filter section 141. The sub-filter section 141 is connected to the first outlet pipe 137. That is, the sub-filter section 141 is located downstream of the valve section 92 in the lead out mechanism 91. By locating the sub-filter section 141 downstream of the valve section 92, air that has entered the valve section 92 more easily returns to the accommodation chamber 41. The sub-filter section 141 is located in the accommodation space 65. The sub-filter section 141 is connected to the valve section 92 by the first coupling 136 and the first outlet pipe 137.

The sub-filter section 141 is configured to collect foreign matter. The sub-filter section 141 includes, for example, a capsule 142 and a sub-filter 143. The capsule 142 accommodates the sub-filter 143. The liquid flows from the container 32 to the connection body 21 by passing through the capsule 142.

The sub-filter 143 is, for example, a non-woven filter. The sub-filter 143 collects foreign matter from the liquid passing through the capsule 142. In this example, the sub-filter 143 is a quaternary filter.

The sub-filter section 141 is configured to collect finer foreign matter than the filter section 81. That is, the collection ability of the sub-filter section 141 is greater than the collection ability of the filter section 81. The collection ability of the sub-filter section 141 depends on the sub-filter 143. The collection ability of the filter section 81 depends on the finest mesh filter among the filters included in the filter section 81. Thus, the mesh size of the sub-filter 143 is finer than the mesh size of the second filter 84. In other words, the filtration particle size of the sub-filter 143 is smaller than the filtration particle size of the second filter 84. The filtration particle size of the sub-filter 143 is, for example, 5 micrometers.

With respect to leading the liquid out from the liquid container 31 to the liquid ejection apparatus 11, the collection abilities required by the filter section 81 and the sub-filter section 141 are different. A passing speed of the liquid is required in the filter section 81 in order to smoothly inject the liquid into the container 32. Therefore, it is sufficient as long as the filter section 81 collects foreign matter to such an extent that the valve section 92 can operate normally. The sub-filter section 141 is required to collect foreign matter so that the ejection section 13 can operate normally.

Generally, the ejection section 13 is more precise than the valve section 92. Therefore, the liquid flowing through the ejection section 13 needs to be filtered more finely than the liquid flowing through the valve section 92. The filter section 81 filters the liquid so that the valve section 92 operates normally. The sub-filter section 141 filters the liquid so that the ejection section 13 operates normally. By collecting the foreign matter in two stages of the filter section 81 and the sub-filter section 141, it becomes easy to inject the liquid while properly collecting the foreign matter.

If the filter section 81 has a fine filter such as the sub-filter 143, the sub-filter section 141 becomes unnecessary. However, in this case, since it is necessary for the liquid to pass through a fine filter in the filter section 81, the injection of the liquid would take longer.

The lead out mechanism 91 has a second outlet pipe 146. The second outlet pipe 146 is, for example, a tube. The second outlet pipe 146 is connected to the sub-filter section 141. In this example, the second outlet pipe 146 is connected to the capsule 142.

The lead out mechanism 91 has a second joint 147. The second joint 147 is connected to the second outlet pipe 146.

The lead out mechanism 91 includes the lead out section 151. The lead out section 151 is connected to the second joint 147. The lead out section 151 is located downstream of the sub-filter section 141 in the lead out mechanism 91. The lead out section 151 is connected to a sub-filter section 141 by the second outlet pipe 146 and the second joint 147. The lead out section 151 is connected to the connection body 21. That is, the lead out section 151 is connected to the liquid ejection apparatus 11. The lead out section 151 is positioned across the inside and outside of the accommodation space 65.

The lead out section 151 constitutes a downstream end in the lead out mechanism 91. In this example, the valve section 92, the first coupling 136, the first outlet pipe 137, the sub-filter section 141, the second outlet pipe 146, the second joint 147, and the lead out section 151 are arranged in this order in the lead out mechanism 91. The position of the valve section 92 and the position of the sub-filter section 141 may be reversed. For example, the valve section 92 may be located downstream of the sub-filter section 141. It is sufficient as long as the valve section 92 is positioned between the lead out port 43 and the lead out section 151. Similarly, it is sufficient as long as the sub-filter section 141 is positioned between the lead out port 43 and the lead out section 151. The lead out section 151 leads out, to the liquid ejection apparatus 11, the liquid that was led out from the lead out port 43.

The lead out section 151 is located on a forward facing surface of the liquid container 31. In this example, the lead out section 151 is attached to the frame 53. The lead out section 151 is attached to the attachment plate 61.

Figure 20:
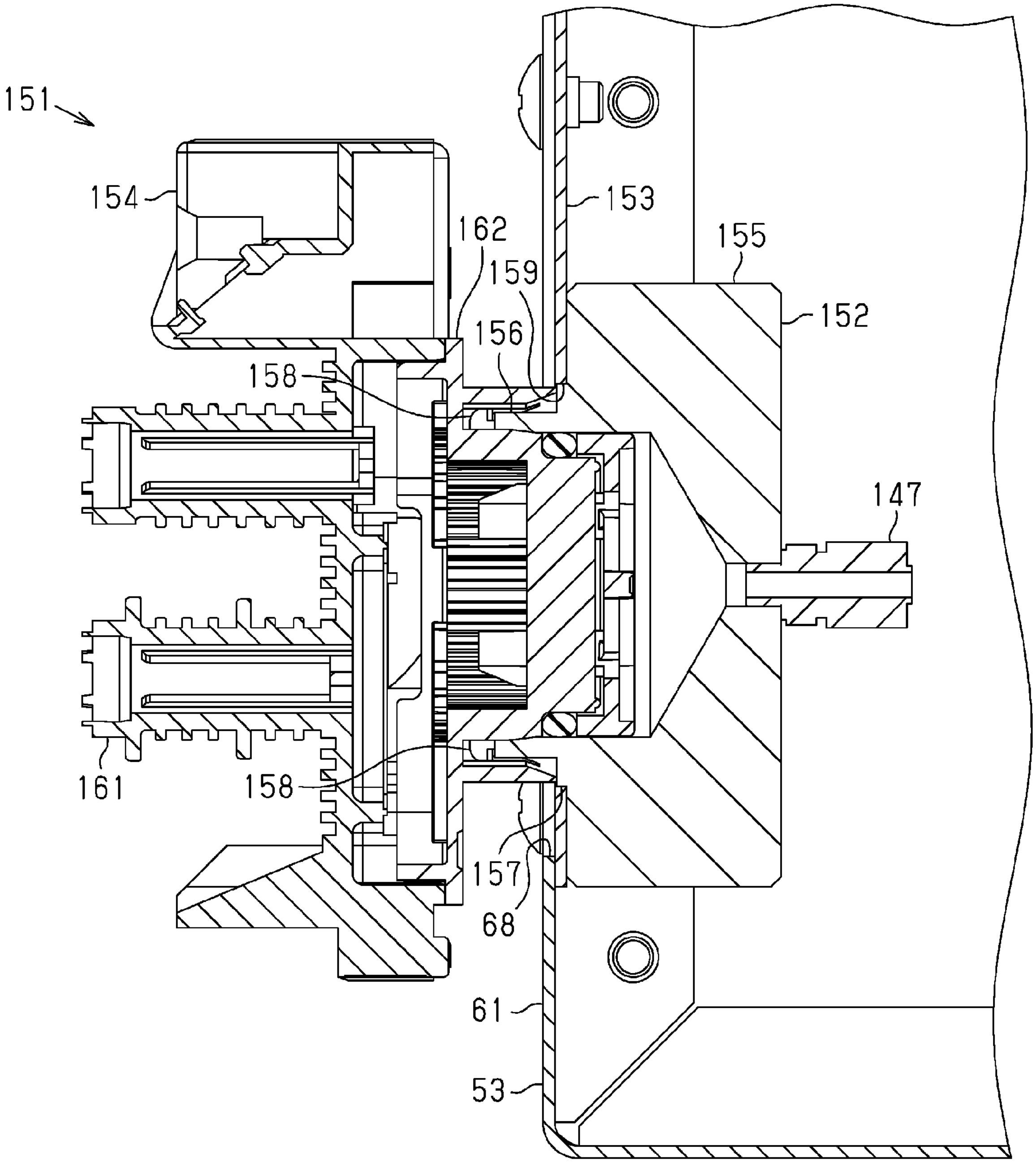
FIG. 20 is an enlarged view of a lower part of FIG. 10.

As shown in FIG. 20, the lead out section 151 includes a first member 152, a fixing plate 153, and a second member 154. The liquid flows from the container 32 to the connection body 21 by passing through the first member 152 and the second member 154.

The first member 152 is a member attached to the fixing plate 153. The first member 152 is connected to the second joint 147.

The first member 152 has a base portion 155 and an insertion portion 156. The base portion 155 is a portion connected to the second joint 147. The base portion 155 is fixed to the fixing plate 153. The insertion portion 156 is a portion extending from the base portion 155. The insertion portion 156 is inserted into the fixing plate 153.

The shape of the insertion portion 156 is cylindrical. The insertion portion 156 has a fitting portion 157. The fitting portion 157 is a portion fitted into the fixing plate 153. The fitting portion 157 is located at the proximal end of the insertion portion 156.

The insertion portion 156 has a plurality of hooks 158. A plurality of hooks 158 are located at the tip of the insertion portion 156. The plurality of hooks 158 are members for connecting the first member 152 and the second member 154 together. The first member 152 and the second member 154 are connected together by hooking the plurality of hooks 158 onto the second member 154.

An insertion hole 159 is opened in the fixing plate 153. The insertion portion 156 is inserted into the insertion hole 159. The diameter of the insertion hole 159 is substantially the same as the diameter of the fitting portion 157. Therefore, when the insertion portion 156 is inserted into the insertion hole 159, the fitting portion 157 fits into the insertion hole 159. Thus, the first member 152 is positioned with respect to the fixing plate 153. The first member 152 is fixed to the fixing plate 153 by, for example, a screw in a state where the fitting portion 157 is fitted into the insertion hole 159. The fixing plate 153 is attached to the attachment plate 61. By this, the lead out section 151 is fixed to the attachment plate 61.

The second member 154 is a member connected to the connection body 21. The second member 154 has a connection pipe 161 and a connection portion 162. The connection pipe 161 is inserted into the connection body 21. The liquid is led out from the connection pipe 161 to the connection body 21. The connection portion 162 is a portion connected to the first member 152. The insertion portion 156 is inserted into the connection portion 162.

Figure 21:
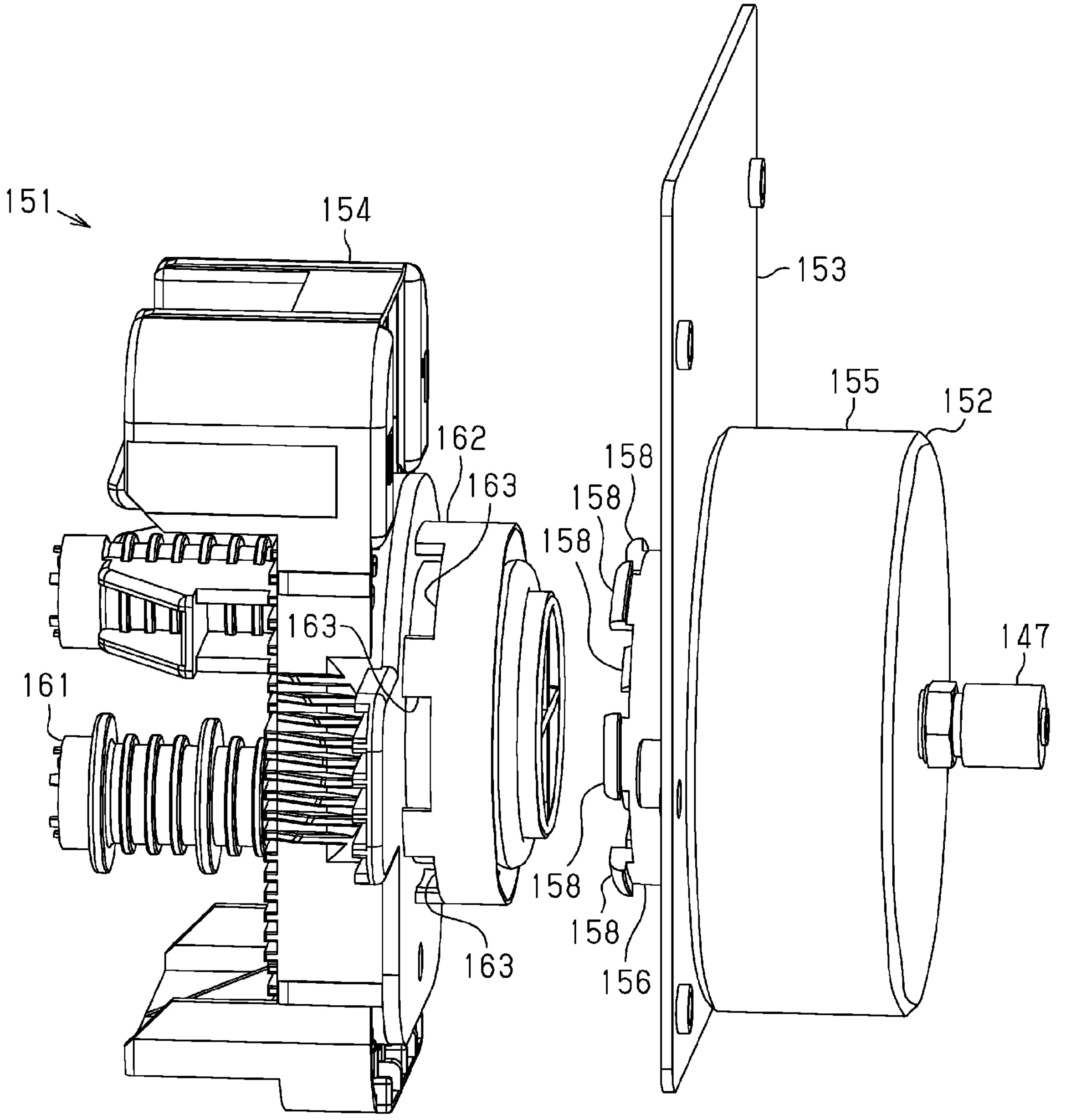
FIG. 21 is an exploded perspective view of a lead out section.
Figure 22:
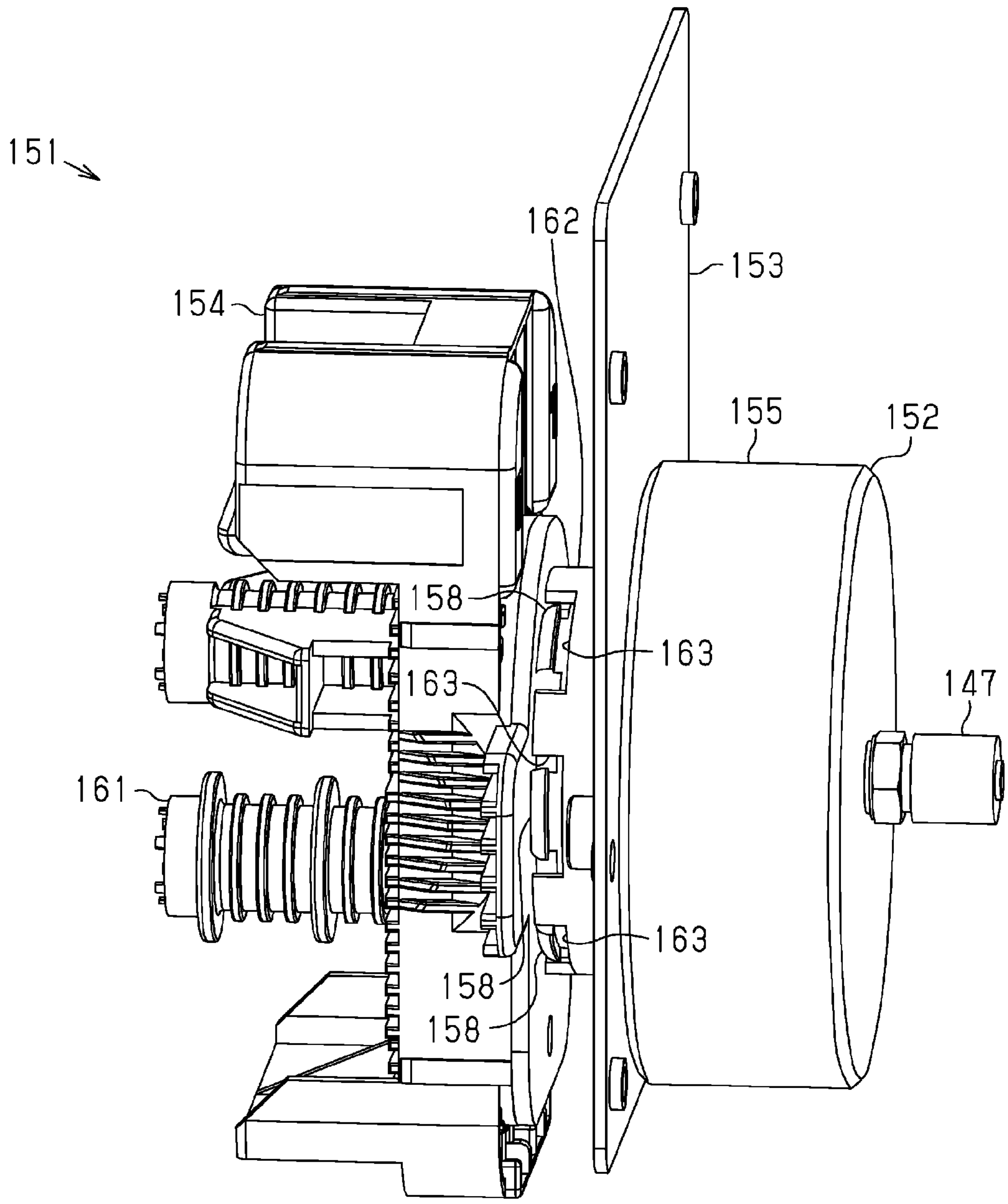
FIG. 22 is a perspective view of the lead out section.

As shown in FIGS. 21 and 22, a plurality of connection openings 163 are formed in the connection portion 162. The plurality of connection openings 163 correspond to the plurality of hooks 158. When the insertion portion 156 is inserted into the connection portion 162, the hooks 158 are located in the connection openings 163. This causes the hooks 158 to hook onto the connection portion 162. The first member 152 and the second member 154 are connected together by hooking the hooks 158 onto the connection portion 162.

Figure 23:
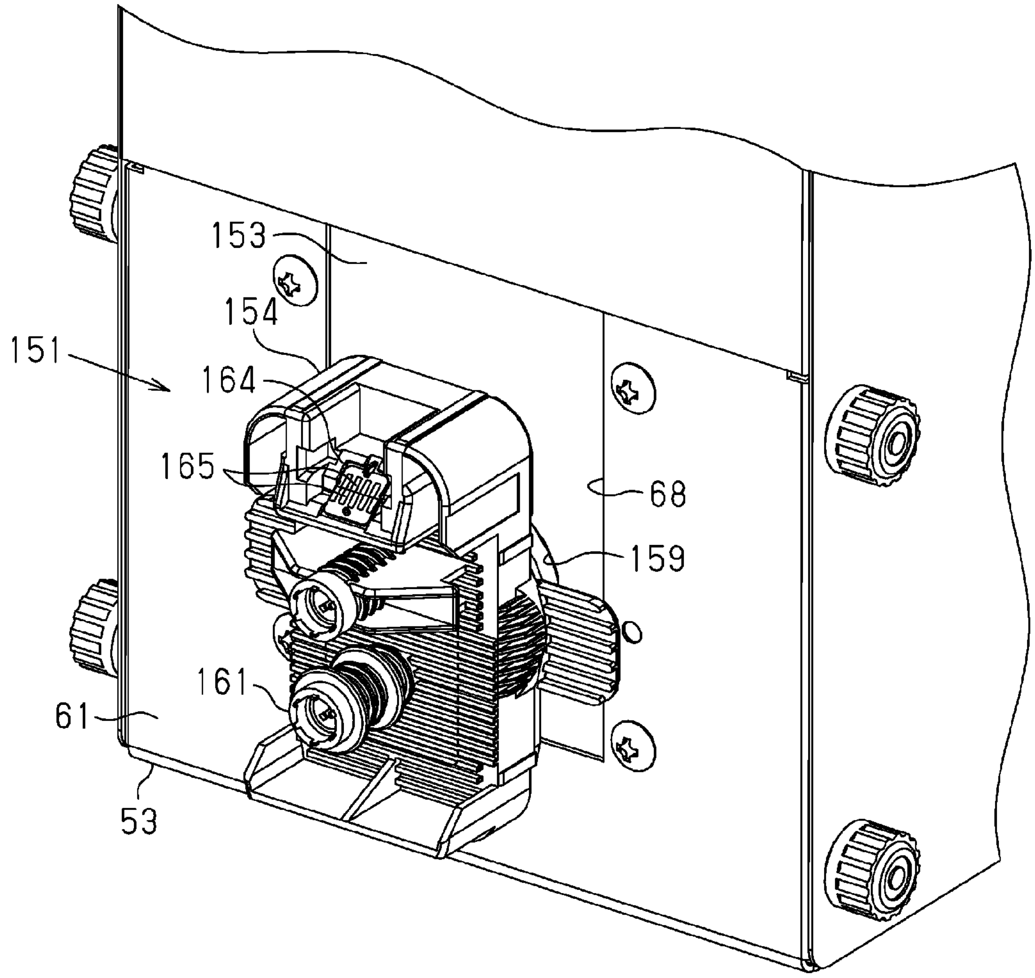
FIG. 23 is an enlarged view of FIG. 8.

As shown in FIG. 23, the lead out section 151 may include a circuit board 164. The circuit board 164 is a board for detecting connection between the lead out section 151 and the connection body 21. The circuit board 164 is connected to the connection section 27. The circuit board 164 is attached to the second member 154. The circuit board 164 is located above the connection pipe 161, for example. This reduces the possibility that the liquid dripping from the connection pipe 161 contacts the circuit board 164.

The circuit board 164 has one or more connection terminals 165. The connection terminal 165 is a terminal that connects to the connection section 27. The connection terminal 165 contacts the connection section 27 as the connection body 21 is connected to the lead out section 151. The circuit board 164 and the connection section 27 are connected by bringing the connection terminal 165 into contact with the connection section 27. Accordingly, the liquid ejection apparatus 11 detects that the liquid ejection apparatus 11 is connected to the liquid container 31.

Next, operations and effects of the above-described embodiment will be described.

(1) The liquid container 31 includes the container 32 that contains the liquid and the filter section 81 that collects foreign matter. An injection port 42 for injecting the liquid into the container 32 and a lead out port 43 for leading the liquid out from the container 32 are opened in the container 32. The filter section 81 is located at the injection port 42. According to the above-described configuration, the filter section 81 reduces the possibility that foreign matter in the liquid, foreign matter in the air, or the like enters the container 32 from the injection port 42.

(2) The filter section 81 includes the first filter 83, which is a primary filter, and the second filter 84, which is a secondary filter and through which liquid that has passed through the primary filter passes. The mesh size of the first filter 83 is larger than that of the second filter 84.

The liquid injected from the injection port 42 might splash by contact with the filter. In particular, the finer the filter mesh, the more difficult it is for liquid to pass through the filter, and thus the liquid is more likely to accumulate in the filter. In this case, there is a possibility that the liquid will splash by bouncing off the filter.

According to the above configuration, the liquid injected from the injection port 42 contacts the first filter 83 before contacting the second filter 84. Since the mesh of the first filter 83 is coarse, the liquid easily passes through the first filter 83. That is, the liquid is less likely to accumulate in the first filter 83. Therefore, compared with the case where the liquid contacts the second filter 84 before contacting the first filter 83, the possibility that the liquid will scatter is reduced.

(3) The liquid container 31 includes the lead out section 151 connected to the liquid ejection apparatus 11. The lead out section 151 is located on a forward facing surface of the liquid container 31, and leads the liquid that was led out from the lead out port 43, out to the liquid ejection apparatus 11. According to the above configuration, the user can easily connect the lead out section 151 and the liquid ejection apparatus 11 from the front side of the liquid container 31.

(4) The container 32 has the front wall 33 and the visual check section 44 for visually checking the liquid level of the contained liquid. The injection port 42 is located at the upper side of the container 32 and at the front side of the container 32. The visual check section 44 is located at the front wall 33.

According to the above configuration, since the injection port 42 is located at the front side of the container 32, a user can easily inject the liquid from a position opposing the front wall 33. In addition, since the visual check section 44 is located at the front wall 33, the user can inject the liquid while checking the liquid level in the container 32 through the visual check section 44.

(5) The liquid container 31 includes the cover 52 that covers the container 32 so as to expose at least the visual check section 44.

According to the above configuration, the cover 52 can protect the container 32 without impairing the function of the visual check section 44.

(6) The liquid container 31 includes the valve section 92 that can be opened and closed and that is located between the lead out port 43 and the lead out section 151, and the frame 53 that supports the container 32 from below. The frame 53 defines the accommodation space 65 accessible from the outside, below the container 32. The valve section 92 is located in the accommodation space 65. According to the above-described configuration, when a failure occurs in the valve section 92, the valve section 92 can be easily accessed. Therefore, maintenance of the valve section 92 is easy.

(7) The liquid container 31 includes the sub-filter section 141 positioned between the lead out port 43 and the lead out section 151. The sub-filter section 141 is located in the accommodation space 65.

According to the above-described configuration, when a failure occurs in the sub-filter section 141, it is possible to easily access the sub-filter section 141. Therefore, maintenance of the sub-filter section 141 is easy.

(8) The frame 53 includes the attachment plate 61 to which the lead out section 151 is attached. The attachment plate 61 is located below the front wall 33 and extends so as to be continuous with the front wall 33. The container 32 has the lower wall 36. The lead out port 43 opens in the lower wall 36 and is located at the rear side of the container 32.

According to the above configuration, since the lead out port 43 is positioned at the rear side of the container 32, a space is created in the accommodation space 65 between the lead out section 151 and the lead out port 43. Therefore, the valve section 92 and the sub-filter section 141 can be easily accommodated in the accommodation space 65.

(9) The cover 52 may cover the accommodation space 65.

According to the above configuration, the valve section 92 and the sub-filter section 141 can be protected by the cover 52.

(10) The cover 52 is fixed to the frame 53.

In a case where the cover 52 is fixed to the container 32, for example, when a force is applied to the cover 52, the force is easily transmitted to the container 32. In this regard, according to the above-described configuration, since the cover 52 is fixed to the frame 53, even if a force is applied to the cover 52, the force is not easily transmitted to the container 32. Therefore, the container 32 can be effectively protected.

(11) The valve section 92 includes the float 94 that moves depending on the remaining amount of liquid contained in the container 32, and opens and closes by the movement of the float 94.

According to the above configuration, the valve section 92 opens and closes without requiring electrical control. Therefore, the configuration of the valve section 92 can be easily made.

(12) The cover 52 includes the grip section 59 to be gripped by the user.

According to the above configuration, it is easy for the user to transport the liquid container 31.

(13) The liquid ejection apparatus 11 includes the connection body 21 connected to the lead out section 151. The connection body 21 includes the connection section 27 for detecting connection with the liquid container 31. The lead out section 151 has the circuit board 164 that connects with the connection section 27. The circuit board 164 has the connection terminal 165 that contacts the connection section 27. According to the above configuration, the liquid ejection apparatus 11 can detect the connection with the liquid container 31 by the connection between the connection section 27 and the circuit board 164.

(14) The collection ability of the sub-filter section 141 is higher than the collection ability of the filter section 81.

Generally, the ejection section 13 is more precise than the valve section 92. Therefore, the liquid flowing through the ejection section 13 needs to be filtered more finely than the liquid flowing through the valve section 92. For example, in a case where foreign matter is collected by the filter section 81 so that the ejection section 13 operates normally, it is necessary to use a fine filter in the filter section 81. In this case, foreign matter is appropriately collected by the filter section 81, but the injection of the liquid will be slower.

According to the above-described configuration, foreign matter is collected in steps by the filter section 81 and the sub-filter section 141. Since the sub-filter section 141 has a fine mesh filter, a coarse mesh filter can be used in the filter section 81. The filter section 81 collects foreign matter so that the valve section 92 operates normally, and the sub-filter section 141 collects foreign matter so that the ejection section 13 operates normally, whereby injection of the liquid will be smooth while properly collecting foreign matter.

The present embodiment can be modified as follows. The present embodiment and the following modifications can be implemented in combination with each other within a range where there is no technical contradiction.

Figure 24:
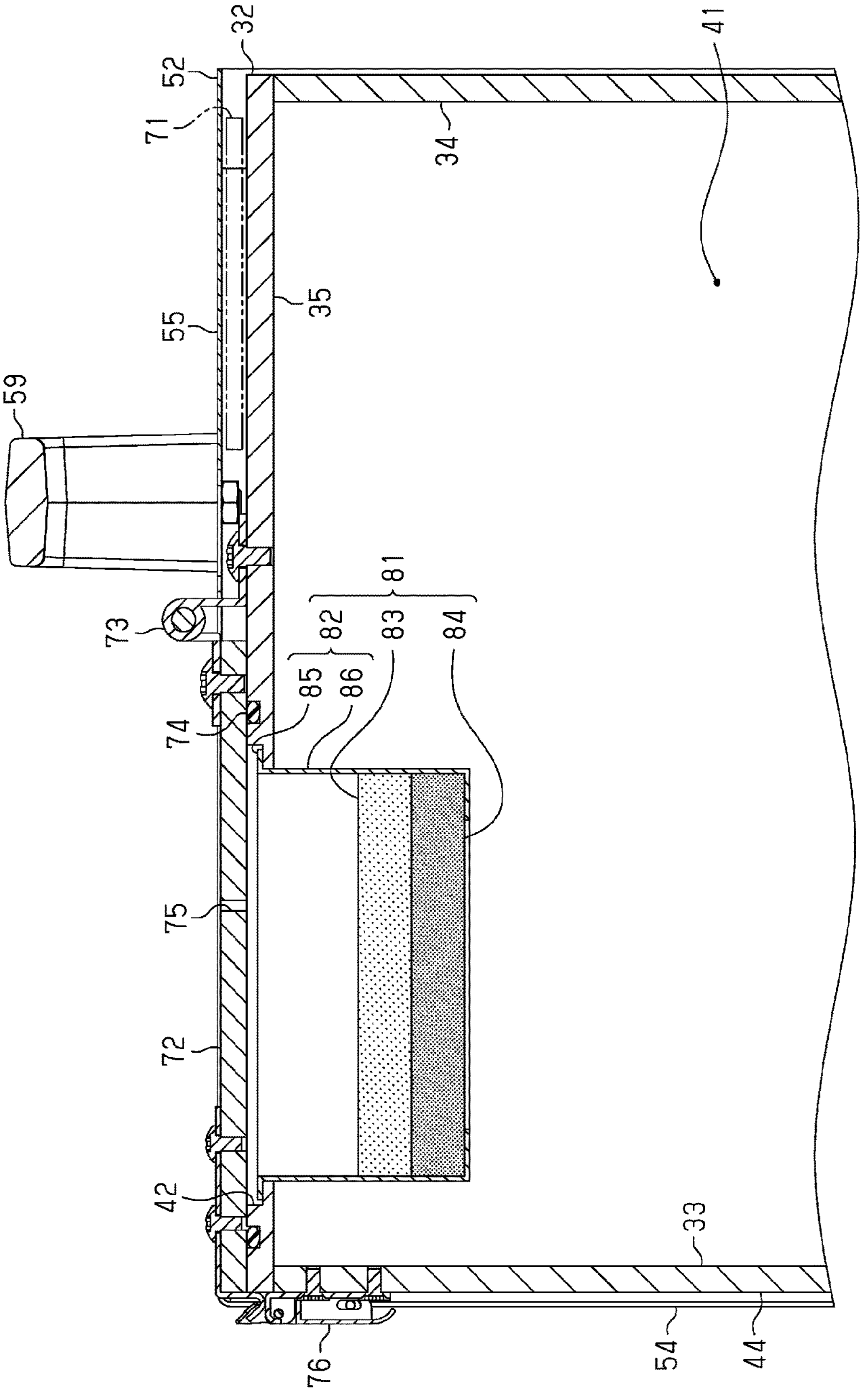
FIG. 24 is a cross-sectional view showing a modification of a filter section.

As shown in FIG. 24, the holding member 82 may not function as a filter but may be configured as a member that simply holds a filter. For example, the filter section 81 may have a configuration including a primary filter, a secondary filter, and a holding member 82 that does not function as a filter. Further, the filter section 81 may have a configuration including a primary filter and a holding member 82 that does not function as a filter.

The filter section 81 may have a configuration including a primary filter and the holding member 82 functioning as a secondary filter. In this case, the mesh size of the holding member 82 is finer than the mesh size of the primary filter.

Figure 25:
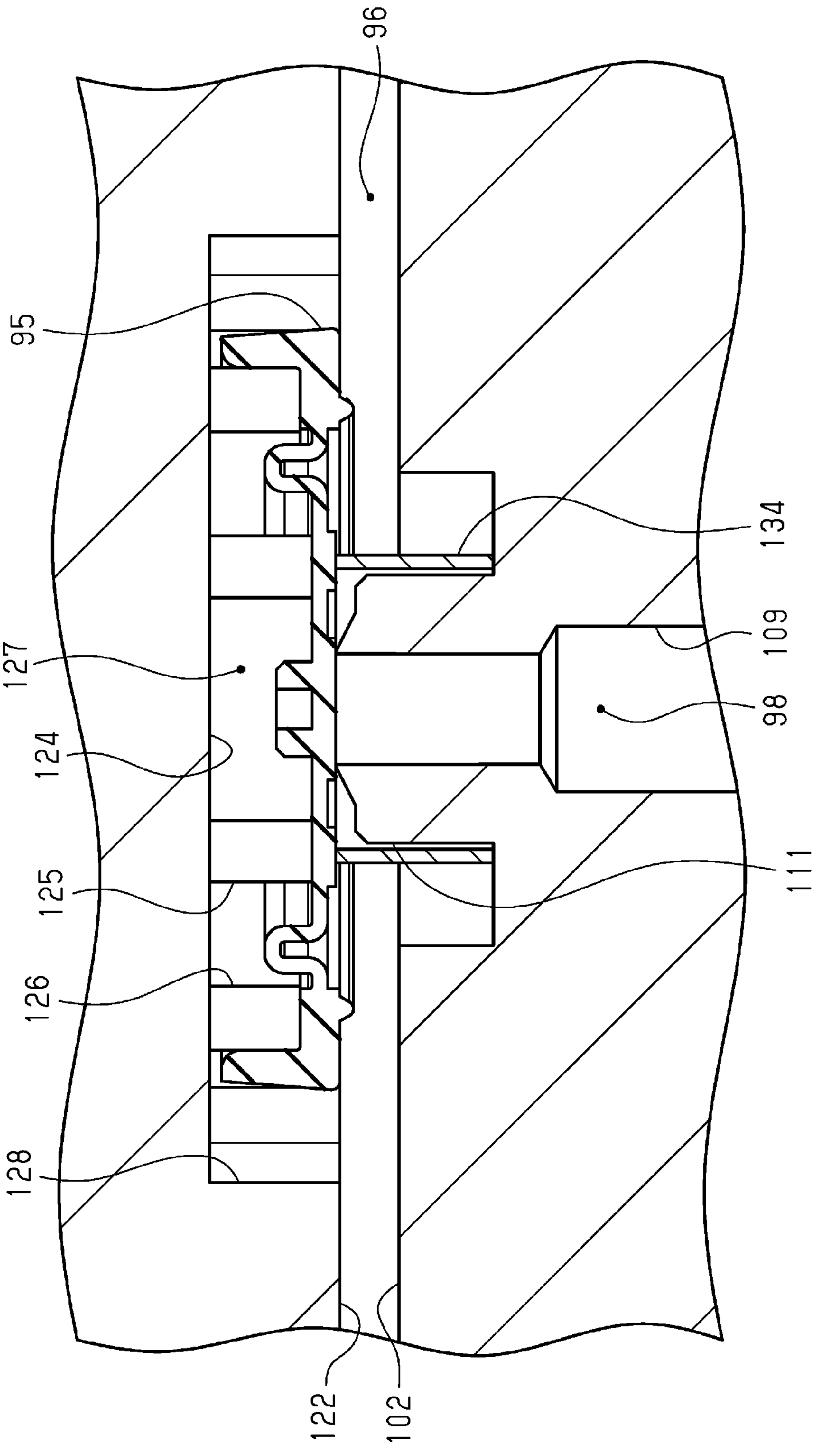
FIG. 25 is a cross-sectional view showing a modification of the valve section.

As shown in FIG. 25, the holder 93 and the float 94 may be sealed by contact between the first contact portion 111 and the seal member 95. That is, the holder 93 may not have the second contact portion 112. Even in this case, it is possible use the displacement space 127 to take care of tilt in the posture of the float 94.

Figure 26:
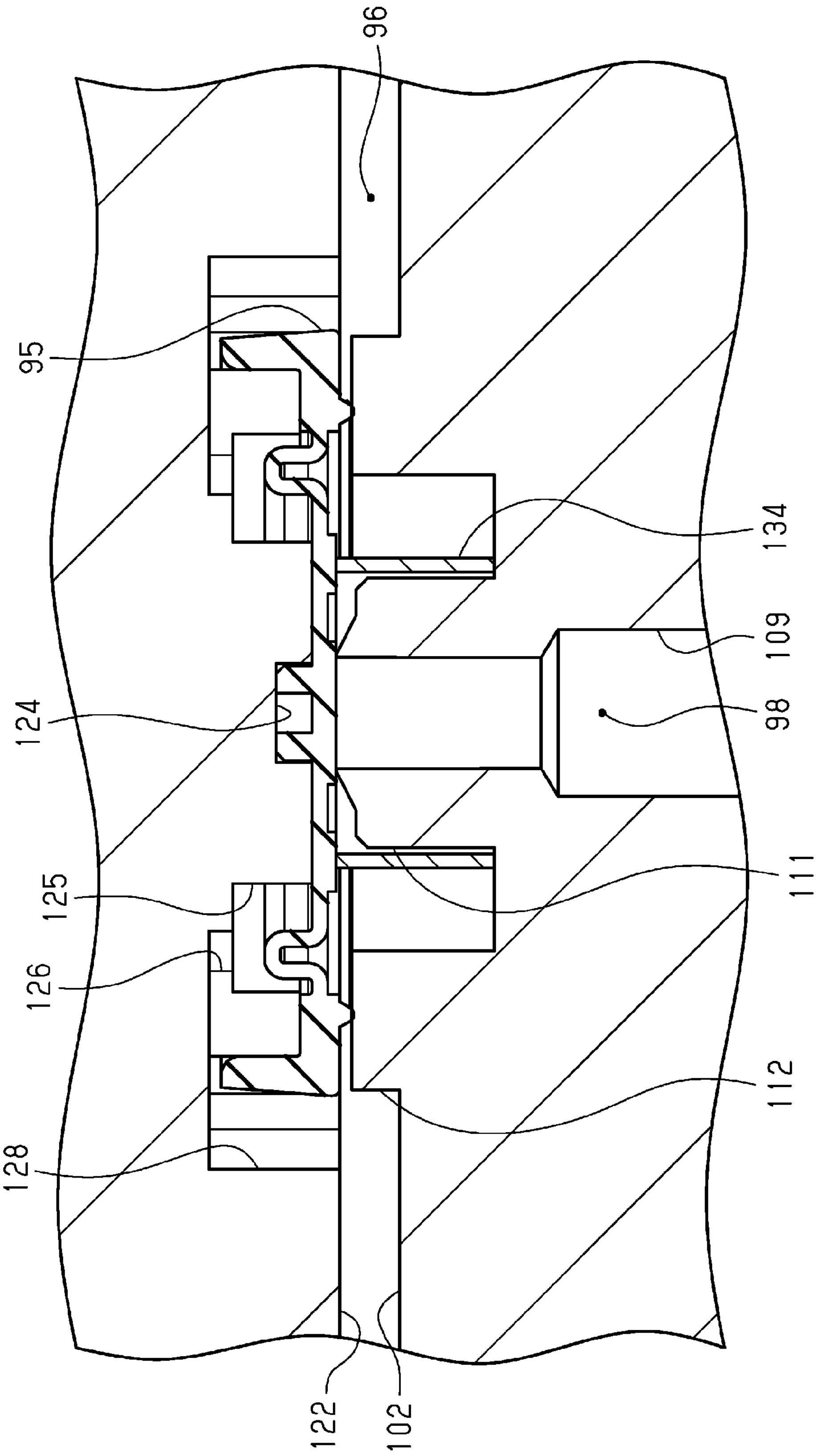
FIG. 26 is a cross-sectional view showing a modification different from FIG. 25.

As shown in FIG. 26, the attachment section 124 may be configured to receive the portion of the seal member 95 that is contacted by the first contact portion 111. That is, the attachment section 124 may be configured so that it does not define the displacement space 127. Even in this case, it is possible to cope with tilt in the posture of the float 94 using the first contact portion 111 and the second contact portion 112.

The injection port 42 may be opened not only in the upper wall 35 but also in the front wall 33, for example. The injection port 42 may be opened in the rear wall 34, the right side wall 37, or the left side wall 38. It is sufficient as long as the injection port 42 is opened at the upper side of the container 32.

The lead out port 43 may be opened not only in the lower wall 36 but also in the front wall 33, for example. The injection port 42 may be opened in the rear wall 34, the right side wall 37, or the left side wall 38. It is sufficient as long as the lead out port 43 is opened at the lower side of the container 32.

Only the portion of the container 32 exposed by the exposure port 58 may be made of a transparent or translucent resin.

The upper wall 35 may include an inclined wall. The inclined wall is, for example, a wall facing upward and forward. The inclined wall may be a wall that faces upward and rearward, a wall that faces upward and rightward, or a wall that faces upward and leftward. The injection port 42 may be open in the inclined wall.

The valve section 92 may be an electromagnetic valve that is electrically opened and closed depending on the remaining amount of the liquid contained in the container 32. In this case, the liquid container 31 includes, for example, a sensor that detects the remaining amount of the liquid contained in the container 32. The valve section 92 opens and closes based on the detection result of the sensor.

The valve section 92 may be located outside the accommodation space 65.

The sub-filter section 141 may be located outside the accommodation space 65.

Hereinafter, technical ideas grasped from the above-described embodiment and modified examples and effects thereof will be described.

(A) A liquid container that is to be connected to a liquid ejection apparatus configured to eject liquid, includes a container configured to contain liquid and a filter section configured to collect foreign matter, wherein an injection port for injecting liquid into the container and a lead out port for leading liquid out from the container are opened in the container and the filter section is located in the injection port. According to the above configuration, the filter section reduces the possibility that foreign matter in the liquid, foreign matter in the air, or the like will enter the container from the injection port.

(B) The above-described liquid container may be such that the filter section includes a primary filter and a secondary filter through which passes liquid that passed through the primary filter and a mesh size of the primary filter is coarser than a mesh size of the secondary filter.

There is a possibility that liquid injected from the injection port might splash by contact with the filter. In particular, the finer the filter mesh, the more difficult it is for liquid to pass through the filter, and thus the liquid is more likely to accumulate in the filter. In this case, there is a possibility that the liquid will splash by bouncing off the filter.

According to the above configuration, the liquid injected from the injection port contacts the primary filter before contacting the secondary filter. Since the mesh of the primary filter is coarse, the liquid easily passes through the primary filter. That is, the liquid is less likely to accumulate in the primary filter. Therefore, compared with the case where the liquid contacts the secondary filter before contacting the primary filter, the possibility that the liquid will scattered is reduced.

(C) The above-described liquid container may further include a lead out section configured to be connected to the liquid ejection apparatus, wherein the lead out section is located on a surface of the liquid container that faces forward and leads the liquid led out from the lead out port to the liquid ejection apparatus. According to the above configuration, the user can easily connect the lead out section and the liquid ejection apparatus from the front side of the liquid container.

(D) The above-described liquid container may be such that the container has a front wall and a visual check section for visually checking a liquid level of the contained liquid, the injection port is located at an upper side of the container and at a front side of the container, and the visual check section is located in the front wall.

According to the above configuration, since the injection port is located at the front side of the container, a user can easily inject the liquid from a position opposing the front wall. In addition, since the visual check section is located at the front wall, the user can inject the liquid while checking the liquid level in the container through the visual check section.

(E) The above-described liquid container may further include a cover that covers the container so as to expose at least the visual check section.

According to the above configuration, the cover can protect the container without impairing the function of the visual check section.

(F) The above-described liquid container may further include a valve section located between the lead out port and the lead out section and configured to open and close and a frame supporting the container from below, wherein the frame defines an externally accessible accommodation space below the container and the valve section is located in the accommodation space. According to the above-described configuration, when a failure occurs in the valve section, the valve section can be easily accessed. Therefore, maintenance of the valve section is easy.

(G) The above-described liquid container may further include a sub-filter section located between the lead out port and the lead out section, wherein the sub-filter section is located in the accommodation space.

According to the above-described configuration, when a failure occurs in the sub-filter section, it is possible to easily access the sub-filter section. Therefore, maintenance of the sub-filter section is easy.

(H) The above-described liquid container may be such that the frame has an attachment plate to which the lead out section is attached, the attachment plate is located below the front wall and extends so as to be continuous with the front wall, the container has a lower wall, and the lead out port is opened in the lower wall and is located at a rear side of the container.

According to the above configuration, since the lead out port is positioned at the rear side of the container, a space is created in the accommodation space between the lead out section and the lead out port. Therefore, the valve section 92 and the sub-filter section can be easily accommodated in the accommodation space 65.

(I) The above-described liquid container may be such that the cover covers the accommodation space.

According to the above configuration, the valve section and the sub-filter section can be protected by the cover.

(J) The above-described liquid container may be such that the cover is fixed to the frame. In a case where the cover is fixed to the container, for example, when a force is applied to the cover, the force is easily transmitted to the container. In this regard, according to the above-described configuration, since the cover is fixed to the frame, even if a force is applied to the cover, the force is not easily transmitted to the container. Therefore, the container can be effectively protected.

(K) The above-described liquid container may be such that the valve section includes a float that moves depending on the remaining amount of the liquid contained in the container, and opens and closes by movement of the float.

According to the above configuration, the valve section opens and closes without requiring electrical control. Therefore, the configuration of the valve section can be easily made.

(L) The above-described liquid container may be such that the cover includes a grip section to be gripped by a user.

According to the above configuration, it is easy for the user to transport the liquid container.

(M) The above-described liquid container may such that the liquid ejection apparatus includes a connection body to be connected to the lead out section, the connection body has a connection section for detecting connection with the liquid container, the lead out section includes a circuit board that connects with the connection section, and the circuit board has a connection terminal that contacts the connection section. According to the above configuration, the liquid ejection apparatus can detect the connection with the liquid container by the connection between the connection section and the circuit board.

(N) The above-described liquid container may be such that the liquid ejection apparatus includes an ejection section that ejects liquid, and the liquid container further includes a lead out section configured to connect to the liquid ejection apparatus, a valve section located between the lead out port and the lead out section and configured to open and close, and a sub-filter section located between the valve section and the lead out section, wherein the lead out section leads out liquid that was led out from the lead out port, to the liquid ejection apparatus and collection ability of the sub-filter section is higher than collection ability of the filter section.

Generally, the ejection section is more precise than the valve section. Therefore, the liquid flowing through the ejection section needs to be filtered more finely than the liquid flowing through the valve section. For example, in a case where foreign matter is collected by the filter section so that the ejection section operates normally, it is necessary to use a fine filter in the filter section. In this case, foreign matter is appropriately collected by the filter section, but injection of the liquid will be slower.

According to the above-described configuration, foreign matter is collected in steps by the filter section and the sub-filter section. Since the sub-filter section has a fine mesh filter, a coarse mesh filter can be used in the filter section. The filter section collects foreign matter so that the valve section operates normally, and the sub-filter section collects foreign matter so that the ejection section operates normally, whereby injection of the liquid becomes smooth while properly collecting foreign matter.

What is claimed is:

1. A liquid container to be connected to a liquid ejection apparatus configured to eject liquid, the liquid container comprising:
- a container configured to contain liquid; and
- a filter section configured to collect foreign matter, wherein
- an injection port for injecting liquid into the container and a lead out port for leading liquid out from the container are opened in the container,
- the liquid container further comprises:
  - a lead out section configured to be connected to the liquid ejection apparatus;
  - a valve section located between the lead out port and the lead out section and configured to open and close; and
  - a frame supporting the container from below,
- the filter section is located in the injection port,
- the lead out section is located on a surface of the liquid container that faces forward and leads the liquid led out from the lead out port to the liquid ejection apparatus,
- the frame defines an externally accessible accommodation space below the container, and
- the valve section is located in the accommodation space.

2. The liquid container according to claim 1, wherein
- the filter section includes a primary filter and a secondary filter through which passes liquid that passed through the primary filter and
- a mesh size of the primary filter is coarser than a mesh size of the secondary filter.

3. The liquid container according to claim 1, wherein
- the container has a front wall and a visual check section for visually checking a liquid level of the contained liquid,
- the injection port is located at an upper side of the container and at a front side of the container, and
- the visual check section is located in the front wall.

4. The liquid container according to claim 3, further comprising:
- a cover that covers the container so as to expose at least the visual check section.

5. The liquid container according to claim 4, further comprising:
- a sub-filter section located between the lead out port and the lead out section, wherein
- the sub-filter section is located in the accommodation space.

6. The liquid container according to claim 5, wherein:
- the frame has an attachment plate to which the lead out section is attached,
- the attachment plate is located below the front wall and extends so as to be continuous with the front wall,
- the container has a lower wall, and
- the lead out port is opened in the lower wall and is located at a rear side of the container.

7. The liquid container according to claim 5, wherein the cover covers the accommodation space.

8. The liquid container according to claim 4, wherein the cover is fixed to the frame.

9. The liquid container according to claim 4, wherein the valve section includes a float that moves depending on the remaining amount of liquid contained in the container, and opens and closes by movement of the float.

10. The liquid container according to claim 4, wherein the cover includes a grip section to be gripped by a user.

11. The liquid container according to claim 1, wherein
- the liquid ejection apparatus includes a connection body to be connected to the lead out section,
- the connection body has a connection section for detecting connection with the liquid container,
- the lead out section includes a circuit board that connects with the connection section, and
- the circuit board has a connection terminal that contacts the connection section.

12. The liquid container according to claim 1, wherein the liquid ejection apparatus includes an ejection section that ejects liquid and the liquid container further comprises:
- a lead out section configured to connect to the liquid ejection apparatus;
- a valve section located between the lead out port and the lead out section and configured to open and close; and
- a sub-filter section located between the valve section and the lead out section, wherein
- the lead out section leads out, to the liquid ejection apparatus, liquid that was led out from the lead out port and
- collection ability of the sub-filter section is higher than collection ability of the filter section.

13. A liquid container to be connected to a liquid ejection apparatus configured to eject liquid, the liquid container comprising:
- a container configured to contain liquid; and
- a filter section configured to collect foreign matter, wherein
- an injection port for injecting liquid into the container and a lead out port for leading liquid out from the container are opened in the container,
- the filter section is located in the injection port,
- the liquid ejection apparatus includes an ejection section that ejects liquid and the liquid container further comprises:
  - a lead out section configured to connect to the liquid ejection apparatus;
  - a valve section located between the lead out port and the lead out section and configured to open and close; and
  - a sub-filter section located between the valve section and the lead out section,
- the lead out section leads out, to the liquid ejection apparatus, liquid that was led out from the lead out port, and
- collection ability of the sub-filter section is higher than collection ability of the filter section.

14. A liquid container to be connected to a liquid ejection apparatus configured to eject liquid, the liquid container comprising:

a container configured to contain liquid; and a filter section configured to collect foreign matter, wherein an injection port for injecting liquid into the container and a lead out port for leading liquid out from the container are opened in the container, the liquid container further comprises:

a lead out section configured to be connected to the liquid ejection apparatus;

a valve section located between the lead out port and the lead out section and configured to open and close; and the filter section is located in the injection port, and the valve section includes a float that moves depending on the remaining amount of liquid contained in the container, and opens and closes by movement of the float.

* * * * *